US009313067B2

(12) United States Patent
Soliman

(10) Patent No.: US 9,313,067 B2
(45) Date of Patent: Apr. 12, 2016

(54) MULTI-BANDWIDTH COMMUNICATION SYSTEM USING A SHARED BASEBAND PROCESSOR

(75) Inventor: Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2275 days.

(21) Appl. No.: 11/838,773

(22) Filed: Aug. 14, 2007

(65) Prior Publication Data

US 2009/0046790 A1 Feb. 19, 2009

(51) Int. Cl.
| | |
|---|---|
| H04L 12/28 | (2006.01) |
| H04L 25/00 | (2006.01) |
| H04L 27/26 | (2006.01) |
| H04B 1/00 | (2006.01) |
| H04L 27/00 | (2006.01) |

(52) U.S. Cl.
CPC .......... *H04L 27/2626* (2013.01); *H04B 1/0067* (2013.01); *H04L 27/0008* (2013.01); *H04L 27/2647* (2013.01); *H04L 27/2657* (2013.01)

(58) Field of Classification Search
CPC ......... H04L 27/28; H04L 5/14; H04B 1/0028
USPC ............................................. 370/252; 11/252
See application file for complete search history.

(56) References Cited

U.S. PATENT DOCUMENTS

| 5,581,575 A | 12/1996 | Zehavi et al. | |
|---|---|---|---|
| 2001/0030939 A1* | 10/2001 | Vijayan et al. | 370/208 |
| 2002/0102987 A1* | 8/2002 | Souisse et al. | 455/454 |
| 2002/0154687 A1* | 10/2002 | Bierly et al. | 375/222 |
| 2003/0149809 A1* | 8/2003 | Jensen et al. | 710/22 |
| 2004/0022267 A1* | 2/2004 | Birru | 370/468 |

(Continued)

FOREIGN PATENT DOCUMENTS

| JP | 5347612 A | 12/1993 |
|---|---|---|
| JP | 11215093 A | 8/1999 |

(Continued)

OTHER PUBLICATIONS

IEEE P802.11n/D2.00 Draft Standard for Information Technology, "Part 11: Wireless LAN Medium Access Contol (MAC) and Physical Layer (PHY) specifications: Amendment <number>: Enhancements for Higher Throughput", Feb. 2007.

(Continued)

*Primary Examiner* — Brandon Renner
(74) *Attorney, Agent, or Firm* — Kevin T. Cheatham

(57) ABSTRACT

Systems and methods are provided for transceiving information via alternate bandwidths using a shared baseband processor. The transmission method selects clock sampling frequencies, for example a first clock frequency (1×F1), or a second clock frequency (k×F1), where k>1. Digital information is processed using the selected clock sampling frequency and a baseband signal is generated. Regardless of the clock sampling frequency selected, the baseband signal may have the same number of subcarrier frequencies. The baseband signal is converted into a radio frequency (RF) signal having a data rate responsive to a selected clock frequency, and transmitted. More explicitly, a first baseband signal is generated having a first data rate in response to selecting the first clock frequency. A second baseband signal having a second data rate greater than the first data rate, may be generated in response to selecting the second clock frequency.

73 Claims, 11 Drawing Sheets

(56) References Cited

U.S. PATENT DOCUMENTS

| | | | |
|---|---|---|---|
| 2004/0076186 A1* | 4/2004 | Chen et al. | 370/503 |
| 2005/0002327 A1* | 1/2005 | Li | 370/210 |
| 2005/0013238 A1* | 1/2005 | Hansen | 370/203 |
| 2005/0014476 A1 | 1/2005 | Oono et al. | |
| 2005/0048997 A1* | 3/2005 | Grobler et al. | 455/550.1 |
| 2005/0239455 A1* | 10/2005 | Stephens | 455/426.2 |
| 2005/0286462 A1 | 12/2005 | Roh et al. | |
| 2006/0057994 A1* | 3/2006 | Anand | 455/260 |
| 2006/0176978 A1* | 8/2006 | Kawai | H04L 27/12 375/303 |
| 2007/0155427 A1* | 7/2007 | Tran | 455/556.2 |
| 2007/0217560 A1* | 9/2007 | Kim et al. | 375/355 |

FOREIGN PATENT DOCUMENTS

| | | |
|---|---|---|
| JP | 2003152815 A | 5/2003 |
| JP | 2006050396 | 2/2006 |
| RU | 2266623 | 12/2005 |
| WO | WO0231988 A2 | 4/2002 |
| WO | 2004002098 A1 | 12/2003 |
| WO | WO-2006035367 A1 | 4/2006 |

OTHER PUBLICATIONS

IEEE 802.11g Standard for Information Technology, "Part 11: Wireless LAN Medium Access Contol (MAC) and Physical Layer (PHY) specifications: Amendment 4: Further Higher Data Rate Extension in the 2.4 GHz Band", Jun. 2003.

IEEE 802.11a Supplement to IEEE Standard for Information Technology, "Part 11: Wireless LAN Medium Access Contol (MAC) and Physical Layer (PHY) specifications: High-speed Physical Layer in the 5 Ghz Band", Sep. 1999.

International Search Report, PCT/US2008/073213, European Patent Office, Mar. 24, 2009.

Written Opinion of the International Searching Authority, PCT/US2008/073213, Mar. 24, 2009.

European Search Report—EP08006317—Search Authority—The Hague—Mar. 17, 2009.

Taiwan Search Report—TW097131063—TIPO—Nov. 9, 2012.

Taiwan Search Report—TW097131063—TIPO—Oct. 1, 2013.

Taiwan Search Report—TW102116256—TIPO—Mar. 12, 2015.

* cited by examiner

MULTI-BANDWIDTH COMMUNICATION SYSTEM USING A SHARED BASEBAND PROCESSOR

BACKGROUND

1. Field

This invention generally relates to wireless communications technology and, more particularly, to systems and methods for using a common baseband processor to enable communications with multiple bandwidths.

2. Background

Frequency spectrum is increasing becoming a scarce commodity as a greater number of communications systems proliferate. Thus, there is increasing pressure to use unlicensed frequency bands. Simultaneously, there is pressure upon communication device manufactures to supply devices that operate in different frequency bands, using different communication protocols. Communication protocols of emerging interest are those compliant with IEEE 802.11g, 802.11a, IEEE 802.11n, and ultra-wideband (UWB). The UWB protocols are described in the Ecma-368 High Rate Ultra Wideband PHY and MAC standard.

Generally, the Federal Communications Commission (FCC) defines UWB as a system using a bandwidth that exceeds the lesser of 500 megahertz (MHz), or 20% of the center frequency. The FCC uses −10 dB emission points to determine bandwidth, and to define the center frequency. UWB technology may be applicable to high and low data rate personal area networks (PANs). The advantage of the large bandwidth is that the system should be able to deliver high date rates over short distances, while sharing the spectrum with other communications systems. For this reason, the FCC has authorized the unlicensed use of UWB in the band between 3.1 gigahertz (GHz) and 10.6 GHz.

UWB can be generated as a pulse type system, where each transmitted pulse occupies the entire UWB frequency bandwidth. An aggregation of narrowband subcarriers are used to generate at least 500 MHz of frequency bandwidth. For example, an orthogonal frequency division multiplexing (OFDM) system may be used. OFDM splits the digital information to be transmitted over a plurality of parallel slower data rate streams. Each of the parallel data streams is modulated onto a particular subcarrier, using a technique such as quadrature phase shift keying (QPSK) for example, and transmitted at a relatively low data rate. The subcarrier frequency is chosen to minimize crosstalk between adjacent channels, which is referred to as orthogonality. The relatively long symbol duration helps minimize the effects of multipath, which is the degradation caused by signals arriving at different times.

802.11, often referred to as WiFi, describes a group of standards that use the same protocol, but different modulation techniques. At the time of this writing, Draft 2.0 of the Working Group is guiding the development of 802.11n. 802.11n operates in the Industrial, Scientific, and Medical (ISM) band at a center frequency of either 2.4 or 5.7 GHz, or in the National Information Infrastructure (U-NII) band (5.2 GHz), at a typical data rate of between 200 and 540 megabits per second. 802.11n builds upon previous 802.11 standards by adding a multi-antenna system referred to as multiple-input multiple-output (MIMO). Each antenna is associated with a separate transmitter and receiver for processing independent, parallel channels. MIMO permits an increase in throughput, without increasing the overall system frequency bandwidth or transmitter power.

802.11n, when using the 2.4 GHz band North American channelization scheme, divides the 2.4 GHz spectrum into 11 overlapping, staggered channels whose center frequencies are 5 megahertz (MHz) apart. A 20 MHZ channel is divided into 56 subcarriers, with a subcarrier spacing of 0.3125 MHz, or 40 MHz channels with 112 subcarriers. Note: some subcarriers are used as pilot subcarriers. Like the above-described UWB system, 802.11n uses OFDM to transmit subcarriers.

It would be advantageous if a communications device could be made to operate in accordance with different protocols, using the same baseband processor equipment. For example, it would be advantageous if a communications device could be made to operate in accordance with both the UWB and 802.11 standards using a shared baseband processor.

SUMMARY

This invention describes a system and method that is able to operate in two modes with two different bandwidths, in accordance with different communications protocols, using a shared baseband processor. For example, UWB waveforms may be generated using a wireless local area network (WLAN) 802.11n baseband processor. The baseband and media access control (MAC) sections can remain the same for the most part.

Accordingly, a method is provided for transmitting information via alternate bandwidths using a shared baseband processor. The method selects a clock sampling frequency. For example, a first clock frequency (l×F1) may be selected, or a second clock frequency (k×F1), where k>1. The baseband signal is generated using selected clock sampling frequencies. Regardless of the clock sampling frequency selected, all the baseband signals generated may have the same number of subcarrier frequencies. The baseband signal is converted into a radio frequency (RF) signal having a data rate responsive to a selected clock frequency, and transmitted.

More explicitly, a first baseband signal is generated having a first data rate in response to selecting the first clock frequency. A second baseband signal may be generated having a second data rate greater than the first data rate, in response to selecting the second clock frequency. Then, a first RF signal with a data rate in a range of about 13.5 to 135 megabits per second (Mbps) is generated in response to the first baseband signal. For example, the first RF signal may be associated with an 802.11n mode of operation using 40 MHz channels. In another aspect, the first RF signal data rate may be in the range of 6.5 to 65 Mbps, corresponding to 20 MHz channels in the 802.11n mode. A second RF signal with a data rate in a range of about 53.3 to 480 Mbps may be generated in response to the second baseband signal, corresponding to UWB operation. However, in other aspects, the second RF signal may operate in the UWB mode at data rates up to 1 GHz.

A method is also provided for receiving information via alternate bandwidths using a shared baseband processor. The method accepts a RF signal having a data rate responsive to a selected clock frequency, and converts the RF signal to a baseband signal. A clock sampling frequency is selected. For example, a first clock frequency (l×F1) may be selected, or a second clock frequency (k×F1), where k>1. The baseband signal is processed using the selected clock sampling frequency, and digital information is generated. More explicitly, a first baseband signal having a first data rate is processed in response to selecting the first clock frequency. Alternately, a second baseband signal, which may have a second data rate greater than the first data rate, is processed in response to selecting the second clock frequency.

Additional details of the above-described methods, transmitter and receiver systems for communicating in multiple bandwidths using a shared baseband processor, as well as other related variations of the above-mentioned invention are presented below.

DETAILED DESCRIPTION

Figure 1:
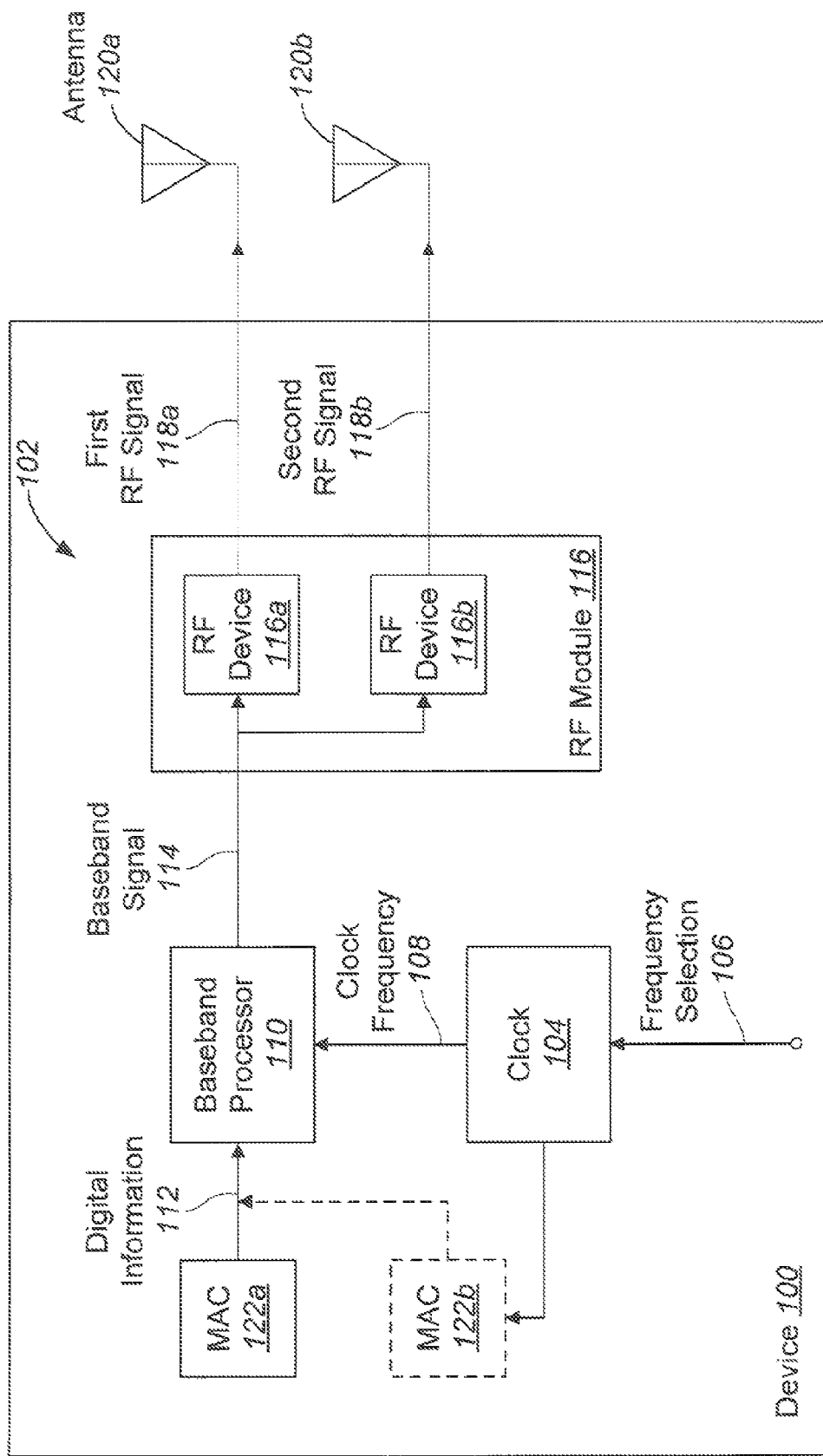
FIG. 1 is a schematic block depicting a system for transmitting information via alternate bandwidths using a shared baseband processor.

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

The various illustrative logical blocks, modules, and circuits that have been described may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the node, or elsewhere. In the alternative, the processor and the storage medium may reside as discrete components in the node, or elsewhere in an access network.

FIG. 1 is a schematic block depicting a system 102 for transmitting information via alternate bandwidths using a shared baseband processor. The system 102 is embedded in communications device 100 and comprises a clock or clocking means 104 having an input on line 106 to accept a frequency selection signal, and an output on line 108 to supply a clock sampling frequency. The selected clock frequency supplied includes a first clock frequency (l×F1), and a second clock frequency (k×F1), where k>1. In one aspect, first clock sampling frequency (l×F1) defines l as either 1 or 2, with F1 being either about 20 MHz or about 40 MHz. The second frequency is then k times the first frequency. That is, the first clock frequency is either 20 or 40 MHz. These frequencies would support the operation of 802.11a/g and 802.11n communications. Further, k is selected so that the second clock sampling frequency supports the operation of UWB communications.

A baseband processor, baseband processor module, or baseband processor means 110 has an input on line 112 to accept digital information and an input on line 108 to accept the selected clock sampling frequency. The baseband processor 110 processes the digital information using the selected clock sampling frequency and supplies a baseband signal on line 114, which has been converted from a digital signal to an analog baseband signal. A radio frequency (RF) module or RF means 116 has an input to accept the baseband signal on line 114. The RF module 116 supplies an RF signal on line 118, converted from the baseband signal for transmission.

The RF signal has a data rate responsive to a selected clock frequency. Generally, the RF module 116 upconverts baseband signals to RF frequencies.

More explicitly, the baseband processor 110 generates a first baseband signal having a first data rate in response to accepting the first clock frequency, or a second baseband signal having a second data rate, in response to accepting the second clock frequency. In one aspect, the second data rate is greater than the first data rate.

In one aspect, the baseband processor 110 generates a first baseband signal having a plurality of subcarrier frequencies in response to accepting the first clock frequency. The second baseband signal may have the same number of subcarrier frequencies in response to accepting the second clock frequency. For example, a 40 MHz channel 802.11n system generates the same number of subcarrier frequencies as UWB, which is 128 subcarriers. Alternately, in contrasting the two systems, there may be differences in the number of subcarriers being used to carry information. For example, a standards-compliant 20 MHz channel 802.11n or 802.11a system only generates 64 subcarriers. In one aspect, a special mode UWB waveform of 64 subcarriers may be generated. In another aspect, a standards-compliant UWB waveform of 128 subcarriers may be generated.

In one aspect, the RF module 116 includes a first RF device 116a, which is a means for generating a first RF signal on line 118a with a data rate in a range of about 13.5 to 135 megabits per second (Mbps), or about 6.5 to 65 Mbps, in response to the first baseband signal. The first RF signal is transmitted on antenna 120a. Although only a single antenna is shown, it should be understood that antenna 120a may represent a system of switchable antennas or a plurality of antennas arranged for diversity. A second RF device 116b is a means for generating a second RF signal with a data rate in a range of about 53.3 to 480 Mbps in response to the second baseband signal. The second RF signal is transmitted on antenna 120b. Again, only a single antenna is shown, but it should be understood that antenna 120b may represent a system of antennas. These data rates are compatible with 802.11n and UWB standards. However, it should be noted that the second RF signal data rates may be as high as 1 GHz.

In another aspect, the first RF device 116a generates a first RF signal with a bandwidth of about 20 to 40 MHz. Note: the above mentioned bandwidths may include pilot tones and other overhead information. The occupied bandwidth may be less than the overall bandwidth. Occupied bandwidth is defined herein as the bandwidth of x % of the total integrated power. The second RF device 116b generates a second RF signal with a bandwidth which is greater than the lesser of about 500 MHz or about 20% of the bandwidth center frequency. Again, these bandwidths would support the operation of 802.11n and UWB communications.

In another aspect, the first RF device 116a generates a first RF signal with subcarrier spacings of about 0.3125 MHz in response to the first baseband signal. The second RF device 116b generates a second RF signal with subcarrier spacings of about 0.3125×k/l MHz in response to the second baseband signal. These subcarrier spacings would support the operation of 802.11n and UWB communications.

In one aspect as shown, a media access control (MAC) module or MAC means 122a has an output on line 112 for supplying digital information to the baseband processor 110 in an Independent Basic Service Set (IBSS) or ad-hoc network format. If the communication networks (not shown) communicating with device 100 via the first and second RF signals are both operating in a peer-to-peer mode, not only can the baseband processor 110 be shared, but the MAC module 122a can also be shared. Peer-to-peer communications are a feature commonly associated with UWB. However, since 802.11a/g and 802.11n typically enable communications through the use of an access point (AP), MAC module 122 may not support communications in all 802.11 networks. In one aspect, the MAC 122 may be clocked at the same rate as the baseband processor.

In one variation, first MAC module or first MAC means 122a has an output on line 112 for supplying digital information to the baseband processor 110 in an infrastructure BSS network format, as explained above. In addition, a second MAC module or second MAC means 122b has an output on line 112 for supplying digital information to the baseband processor 110 in an IBSS network format. Then, the baseband processor 110 may generate the first baseband signal in response to the infrastructure BSS MAC format, and the second baseband signal in response to the IBSS MAC format. In this variation, the first (infrastructure BSS) MAC module 122a is used to support communications involving the use of APs, as in conventional 802.11n networks. However, the second MAC module 122b is used for networks using the peer-to-peer methodology.

Figure 2:
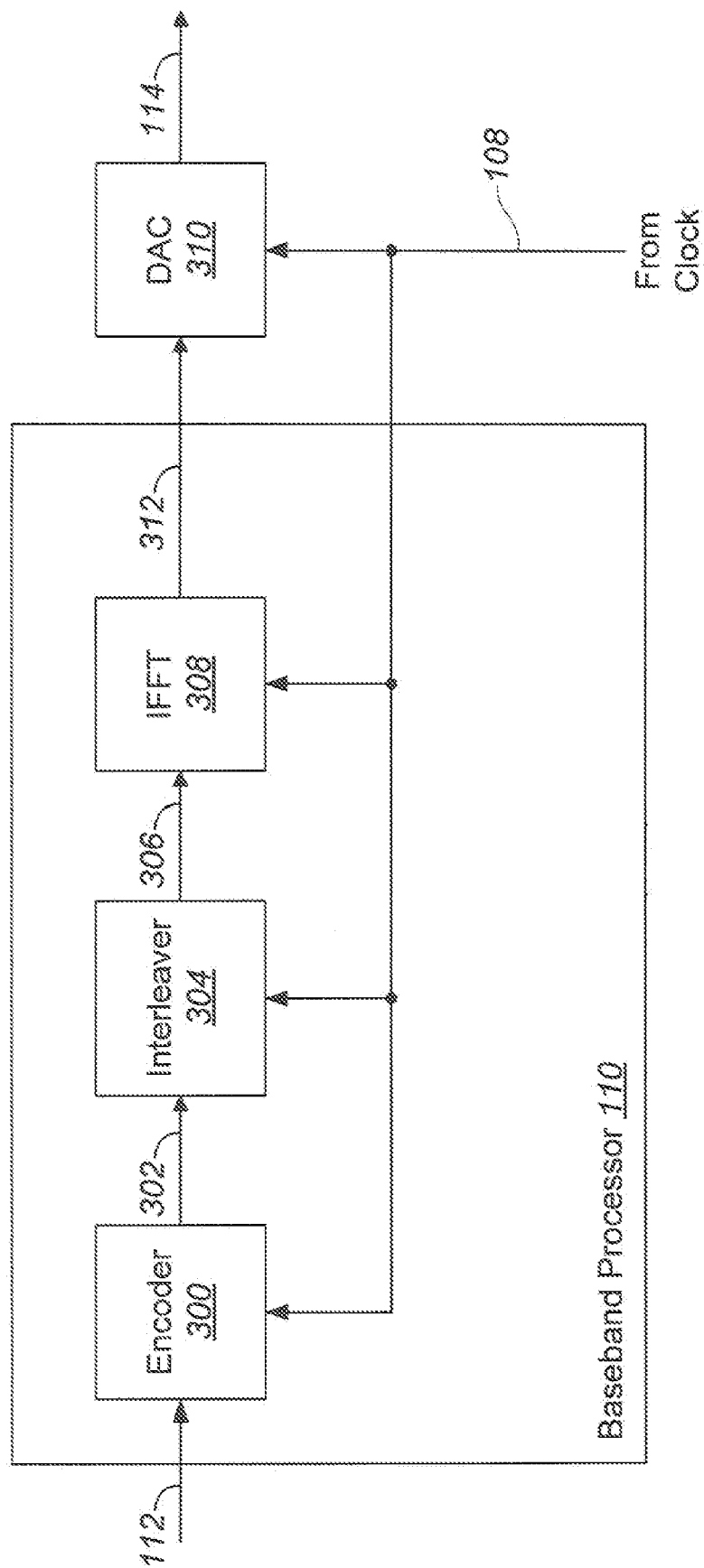
FIG. 2 is a schematic block diagram depicting the baseband processor of FIG. 1 in greater detail.

FIG. 2 is a schematic block diagram depicting the baseband processor of FIG. 1 in greater detail. In one variation, the baseband processor 110 includes an encoder or means for encoding 300 having an input on line 112 to accept digital information, an output on line 302 to supply encoded digital information in the frequency domain, and an input on line 108 to accept a selected clock frequency. An interleaver or means for interleaving 304 has an input on line 302 to accept the encoded digital information, an output on line 306 to supply interleaved information in the frequency domain, and an input on line 108 to accept a selected clock frequency. The interleaver 304 is the device that provides a form of time diversity to guard against localized corruption or bursts of errors. The interleaving parameters are usually carefully selected to match the error correcting capabilities of the codes involved. An inverse fast Fourier transform (IFFT) block or IFFT means 308 has an input on line 306 onto accept information in the frequency domain and an input on line 108 to accept a selected clock frequency. The IFFT block 308 performs an IFFT operation on the input information and supplies a digital time domain signal. A digital-to-analog converter 310 converts the digital signal on line 312 to an analog baseband signal on line 114, responsive to the selected clock frequency on line 108. It should be understood that although all the devices are shown connected to a common clock line, the devices are not necessarily operated at the same clock frequency. Alternate circuitry configurations capable of performing the same functions as described above would be known by those with skill in the art. Note: the DAC may alternately be co-located with the baseband processor or with the RF module (not shown).

Figure 3:
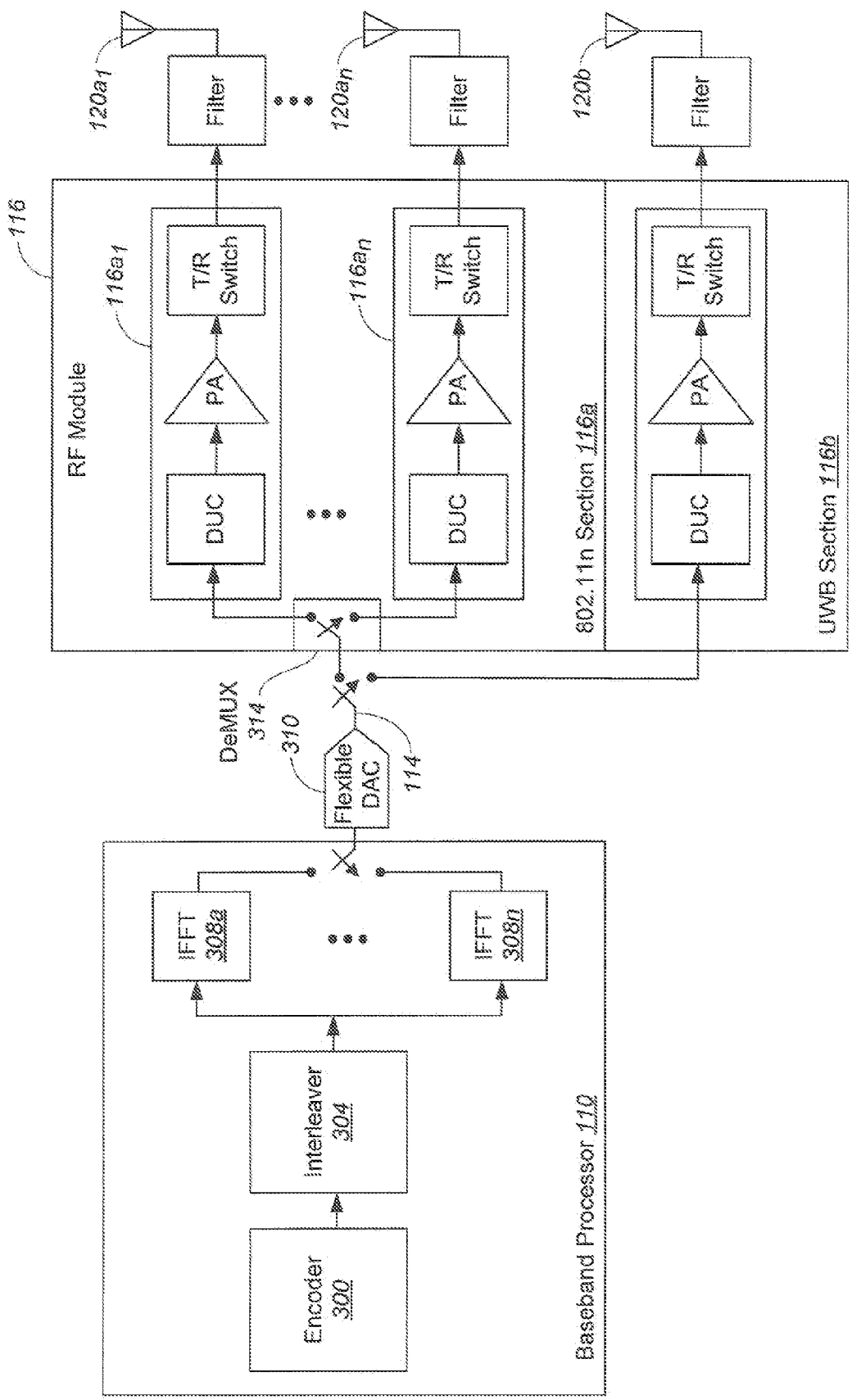
FIG. 3 is a schematic block diagram depicting a variation of the system illustrated in FIG. 1.

FIG. 3 is a schematic block diagram depicting a variation of the system 102 illustrated in FIG. 1. The baseband processor 110 supplies a second baseband signal from n parallel streams (IFFTs 308a through 308n) operating at the first clock frequency. The baseband processor 110 supplies a multiplexed second baseband signal on line 114. Note: n is not limited to any particular number. The RF module 116 converts the multiplexed second baseband signal into a single (multiplexed) RF signal which is radiated by antenna or radiating means 120b at a data rate responsive to the second clock frequency. The second clock frequency is n times faster than the first clock frequency. This variation would permit parallel RF stream circuitry (e.g., designed for 802.11n MIMO) to be transmitted as a single, higher rate signal (e.g., a UWB signal). As explained below, the UWB baseband signal can be generated with the same baseband circuitry used for 802.11n. Advantageously, if high communication data rates are desired, the various components of the baseband processor 110 and DAC 310 need only be operated at a higher clock frequency that the first clock frequency used in this example. The digital upconverter (DUC) converts the baseband signal to RF. Alternately, an analog mixer may be user for frequency conversion.

The baseband processor 110 supplies a first baseband signal by generating n baseband signals in n parallel streams. In one aspect as shown, the baseband processor 110 supplies a multiplexed baseband signal on line 114. Note: n is not limited to any particular number. The DAC 310 is connected to a demultiplexer (DEMUX) or demultiplexing means 314, which converts the multiplexed baseband signal back into n baseband signals. The RF module includes n RF devices (n RF means), each RF device (116a1 through 116an) has an input connected to a corresponding demultiplexer output, and an output connected to a corresponding antenna or radiating means 120a1 through 120an. In one aspect not shown, the n RF streams are carried by a hard-wired medium. Each radiated RF signal has a data rate responsive to the first clock frequency. Alternately but not shown, n discrete DACs may be used to directly connect each IFFT to a corresponding RF device so that the baseband streams need not be multiplexed for delivery to the DAC, or demultiplexed after conversion to analog signals.

Contrasting the UWB and 802.11n modes of operation, in one 4×4 MIMO 802.11n system example, the value of k associated with the second clock frequency may be 3.3 to produce a 132 MHz clock for each data path. Higher clock rates can be used to enable a UWB mode of operation with a higher data rate. For non-MIMO systems such as 1×1 802.11n or 802.11a, k may be as high as 13.2.

The explanation and descriptions of FIGS. 1 through 3 above, are also applicable to a communications processing device for transmitting information via alternate bandwidths using a shared baseband processor module. The processing device comprises a clock module having an input to accept a frequency selection signal and an output to supply a clock sampling frequency, which is either a first clock frequency (l×F1) or a second clock frequency (k×F1), where k>1. A baseband processing module has an input to accept digital information and an input to accept a selected clock frequency. The baseband processing module processes the digital information using a selected clock frequency and supplies a baseband signal.

A radio frequency (RF) module has an input to accept the baseband signal. The RF module supplies an RF signal having a data rate responsive to a selected clock frequency, converted from the baseband signal, which may be transmitted. In one aspect, the baseband processing module generates a first baseband signal having a first data rate in response to accepting the first clock frequency. Alternately, the baseband processing module generates a second baseband signal having a second data rate, greater than the first data rate, in response to accepting the second clock frequency.

Figure 4:
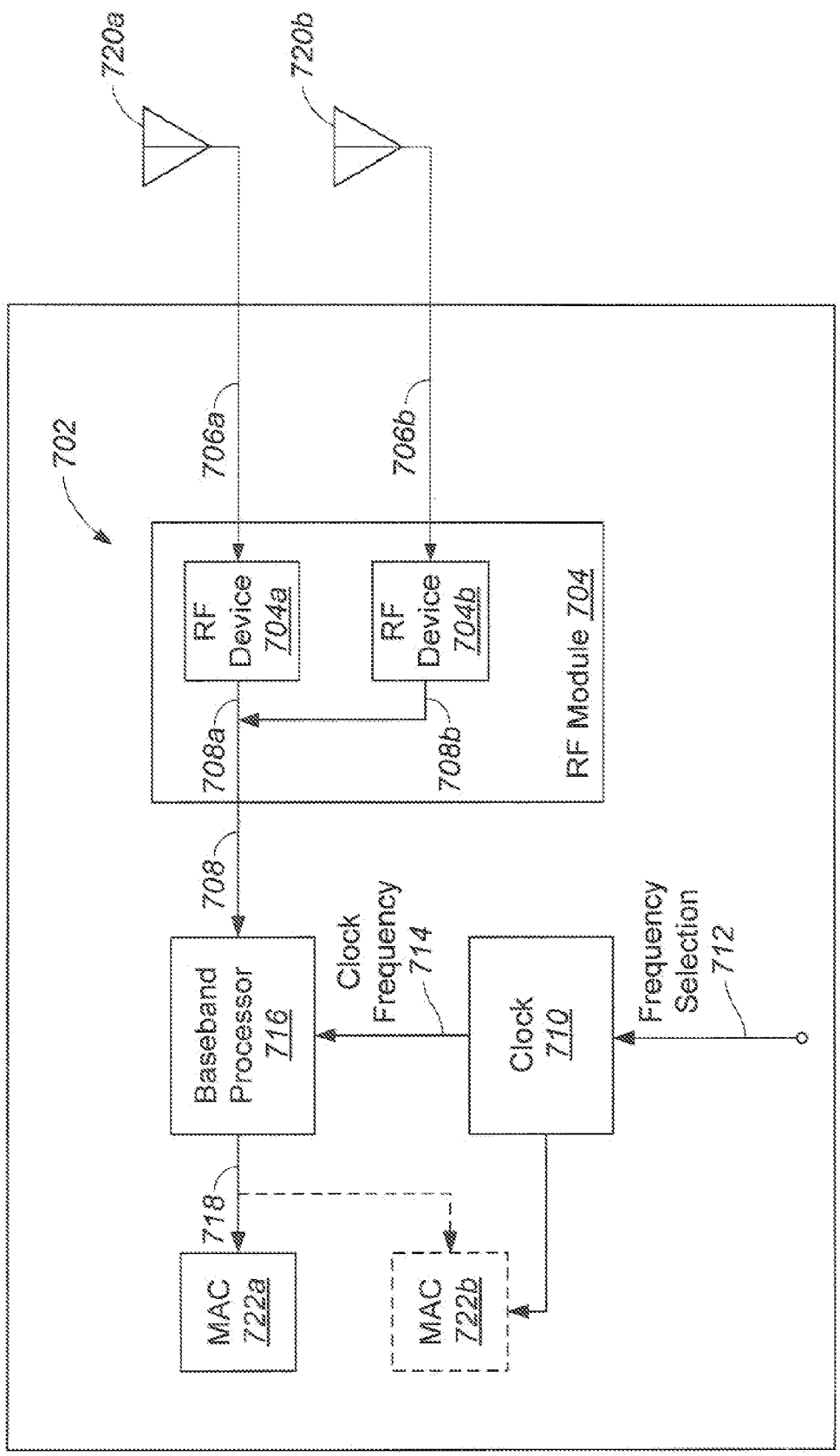
FIG. 4 is a schematic block diagram depicting a system for receiving information via alternate bandwidths using a shared baseband processor.

FIG. 4 is a schematic block diagram depicting a system 702 for receiving information via alternate bandwidths using a shared baseband processor. The system 702 is embedded in a communications device 700 and includes an RF module or RF means 704 having an input on line 706 to accept a radiated RF signal (as shown), or an RF signal from a hard-wired medium (not shown). The RF signal has a data rate responsive to a selected clock frequency. The RF module 704 has an output to supply a baseband signal on line 708, converted from the RF signal. A clock or clocking means 710 has an input on line 712 to accept a frequency selection signal and an output on line 714 to supply a clock sampling frequency. The selectable frequencies include a first clock frequency (l×F1) and a second clock frequency (k×F1), where k>1. In one aspect, first clock sampling frequency (l×F1) defines 1 as either 1 or 2, with F1 being either about 20 MHz or about 40 MHz. That is, the first clock frequency is either 20 or 40 MHz. The second frequency is k times the first frequency. These frequencies would support the operation of 802.11n, 802.11a, 802.11g, and UWB communications.

A baseband processor or baseband processor means 716 has an input on line 708 to accept the baseband signal and an input on line 714 to accept the selected clock sampling frequency. The baseband processor 716 processes the baseband signal using the selected clock sampling frequency and supplies digital information on line 718. In one aspect, the baseband processor 716 processes a first baseband signal having a first data rate in response to selecting the first clock frequency. Alternately, the baseband processor 716 processes a second baseband signal having a second data rate, greater than the first data rate, in response to selecting the second clock frequency.

In one aspect, the baseband processor 716 processes a first baseband signal on line 708 having a plurality of subcarrier frequencies in response to accepting the first clock frequency. The baseband processor 716 processes second baseband signal on line 708, which may have the same number of subcarrier frequencies, in response to accepting the second clock frequency. For example, a 40 MHz channel 802.11n generates the same number of subcarrier frequencies as UWB, which is 128 subcarriers. However, as noted above, in other aspects there may be differences in the number of subcarriers being used to carry information by the first and second baseband signals.

In another aspect, the RF module 704 includes a first RF device 704a, which is a means for accepting a first RF signal with a data rate in a range of about 13.5 to 135 Mbps or about 6.5 to 65 Mbps, and supplying the first baseband signal on line 708a. The first RF device 704a is connected to antenna 720a on line 706a. Although only a single antenna is shown, it should be understood that antenna 720a may represent a system of antennas. The RF module 704 also includes a second RF device 704b, which is a means for accepting a second RF signal with a data rate in a range of about 53.3 to 480 Mbps, and supplying the second baseband signal on line 708b. The second RF device 704b is connected to antenna 720b on line 706b. Although only a single antenna is shown, it should be understood that antenna 720b may represent a system of antennas. These data rates are compatible with 802.11 and UWB standards.

In one aspect, the first RF device 704a accepts a first RF signal with a bandwidth of about either a 20 MHz or 40 MHz, and supplies the first baseband signal on line 708a. Alternately, the second RF device 704b accepts a second RF signal a bandwidth which is greater than the lesser of about 500 MHz or 20% of the bandwidth center frequency, and supplies the second baseband signal on line 708b. Note: the above-mentioned bandwidths may include pilot tones and other overhead information. The occupied bandwidth may be less than the overall bandwidth. These bandwidths are compatible with 802.11n, 802.11a, 802.11g, and UWB standards.

In one aspect, the first RF device 704a accepts a first RF signal with subcarrier spacings of about 0.3125 MHz, and supplies the first baseband signal on line 704a. Alternately, the second RF device 704b accepts a second RF signal with subcarrier spacings of about 0.3125×k/l MHz, and supplies the second baseband signal on line 708b.

In one aspect as shown, a media access control (MAC) module or MAC means 722a has an input on line 718 for accepting digital information from the baseband processor 716 in an IBSS network format. If the communication networks (not shown) communicating with device 700 via the first and second RF signals are both operating in a peer-to-peer mode, not only can the baseband processor 716 be shared, but the MAC module 722a can also be shared. Peer-to-peer communications are a feature commonly associated with UWB. However, since 802.11 typically enables communications through the use of an access point (AP), MAC module 722a may not support communications in all 802.11 networks. In this aspect (shown), the MAC 722a may be clocked at the same frequency as the baseband processor.

Alternately, first MAC module or first MAC means 722a has an input on line 718 for accepting digital information from the baseband processor 716 in an infrastructure BSS network format. A second MAC module or second MAC means 722b has an output on line 718 for accepting digital information from the baseband processor 716 in an IBSS or ad-hoc network format. Then, the baseband processor 716 generates the infrastructure BSS MAC format digital information in response to the first baseband signal. Alternately, the baseband processor 716 generates IBSS MAC format digital information in response to the second baseband signal. In this variation, the first (infrastructure BSS) MAC module 722a is used to support communications involving the use of APs, as in conventional 802.11n and 802.11a networks. However, the second MAC module 722b is used for networks using the peer-to-peer methodology.

Figure 5:
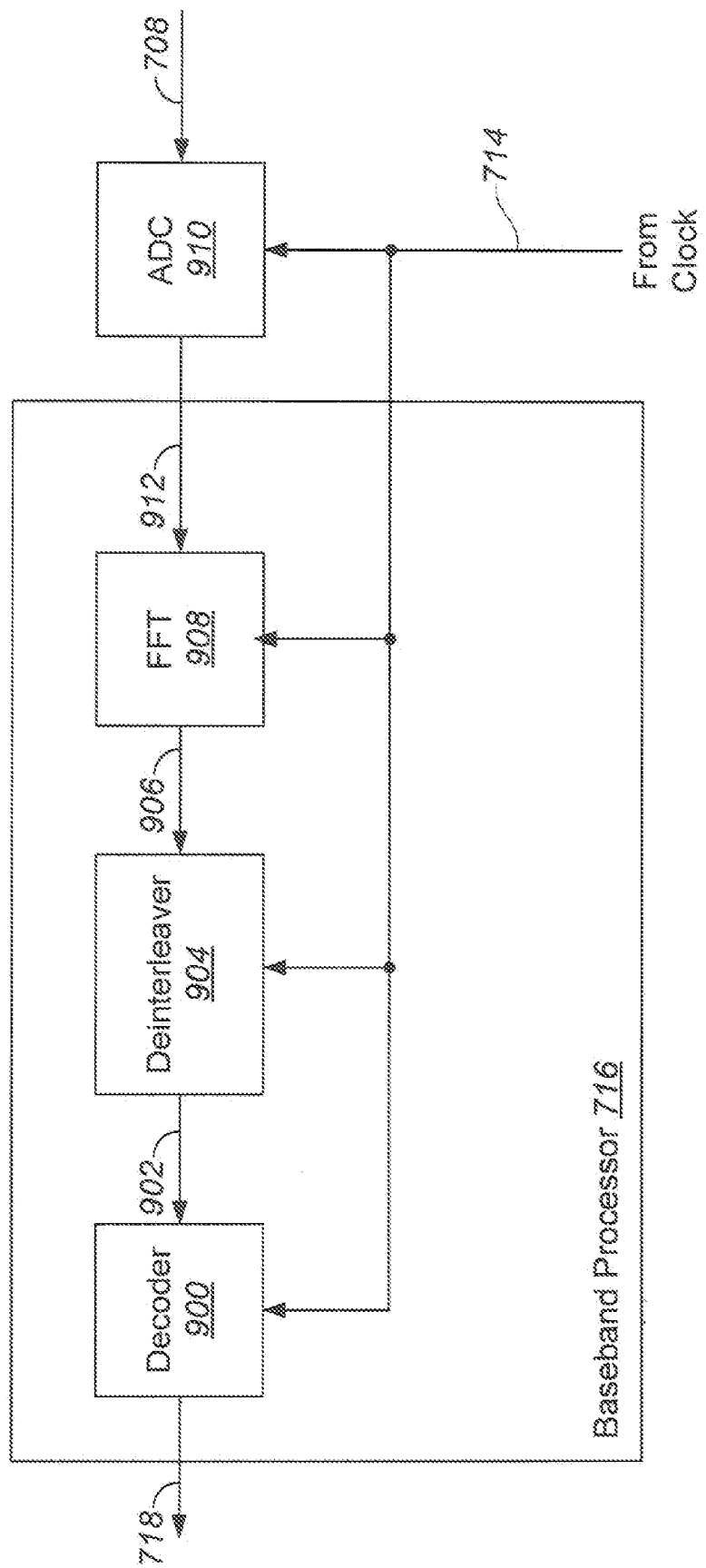
FIG. 5 is a schematic block diagram depicting the baseband processor of FIG. 4 in greater detail.

FIG. 5 is a schematic block diagram depicting the baseband processor of FIG. 4 in greater detail. In one variation, the baseband processor 716 includes a decoder or means for decoding 900 having an output on line 718 to supply digital information, an input on line 902 to accept encoded digital information in the frequency domain, and an input to accept a selected clock frequency on line 714. A deinterleaver or means for deinterleaving 904 has an output on line 902 to supply the encoded digital information, an input on line 906 to accept interleaved information in the frequency domain, and an input to accept a selected clock frequency on line 714. The deinterleaver 904 is the device that converts the plurality of parallel streams into a single input signal. A fast Fourier transform (FFT) block or FFT means 908 has an output on line 906 to supply interleaved information in the frequency domain and an input to accept a selected clock frequency on line 714. An analog-to digital converter (ADC) 910 converts the analog baseband signal on line 708 to a digital signal on line 912, responsive to a selected clock frequency on line 714. The FFT block 908 performs an FFT operation on the digital signal of line 912.

Figure 6:
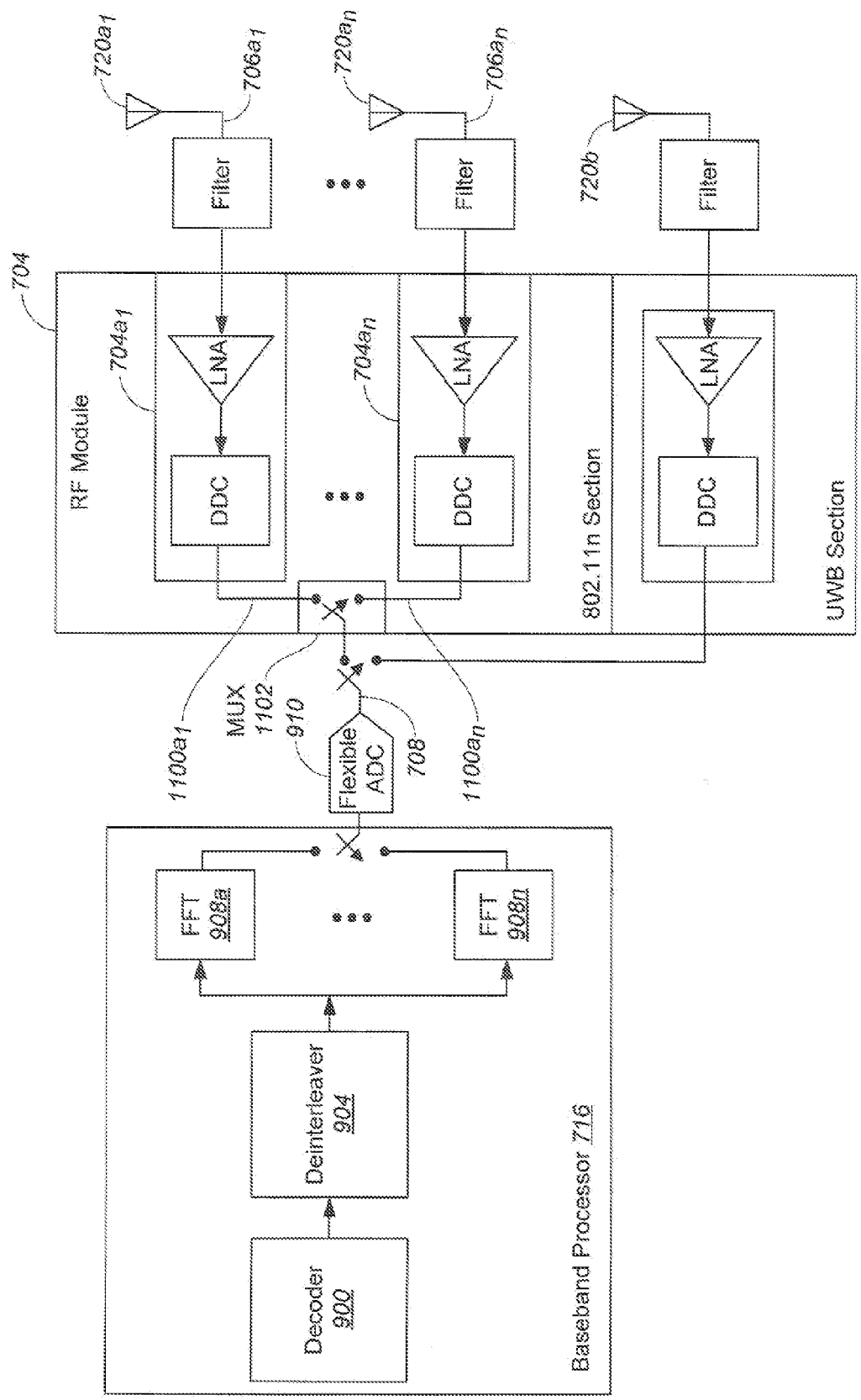
FIG. 6 is a schematic block diagram depicting a variation of the system illustrated in FIG. 4.

FIG. 6 is a schematic block diagram depicting a variation of the system 702 illustrated in FIG. 4. The RF module 704 accepts a single multiplexed RF signal on antenna or radiating means 720 and converts it to a multiplexed second baseband signal on line 708. The single multiplexed RF signal has a data rate responsive to the second clock frequency, which in this example is n times faster than the first clock frequency. The baseband processor 716 generates n baseband signals. The baseband processor 716 processes each of the n baseband signals at the first clock frequency, and generates digital information on line 718. Note: n is not limited to any particular number. This variation would permit parallel RF transmission path circuitry (e.g., designed for 802.11n MIMO) to be received as a single, higher rate signal (e.g., a UWB signal).

As explained below, the UWB baseband signal can be recovered with the same baseband circuitry used for 802.11n. Advantageously, if high communication data rates are desired, the various components of the baseband processor 716 and ADC 910 need only be operated at a higher clock frequency that the first clock frequency used in this example. A digital downconverted (DDC) converts the RF signal to broadband. Alternately, an analog mixer may be user for frequency conversion.

Alternately, antennas or radiating means 720a1 through 720an receive n RF signals at a data rate responsive to the first clock frequency, which are supplied on lines 706a1 through 706an to corresponding RF devices or RF means (704a1 through 704an) in the RF module 704. Alternately but not shown, the n RF signals are received via a hard-wired medium. Each RF device converts an RF signal into a baseband signal, supplied on lines 1100a1 through 1100an. In this example, a multiplexer (MUX) or multiplexing means 1102 accepts the n baseband signals on lines 1100a1 through 1100an and supplies a multiplexed baseband signal on line 708. The baseband processor 716 demultiplexes the input baseband signal, creating n baseband signals (streams) that are processed in response to the first clock frequency. Alternately but not shown, n discrete ADCs may be used to directly connect each FFT to a corresponding RF device, in which case the n baseband streams need not be multiplexed for delivery to the ADC or demultiplexed after conversion to digital signals.

The description and explanation of FIGS. 4 through 6 is also applicable to a communications processing device for receiving information via alternate bandwidths using a shared baseband processor module. The processing device comprises an RF module having an input to accept an RF signal having a data rate responsive to a selected clock frequency, and an output to supply a baseband signal converted from the RF signal. A clock module has an input to accept a frequency selection signal and an output supplies a clock sampling frequency. The frequency is selected from a first clock frequency (l×F1) and a second clock frequency (k×F1), where k>l.

A baseband processor module has an input to accept the baseband signal and an input to accept the selected clock frequency. The baseband processor module processes the baseband signal using the selected clock frequency, and supplies digital information. In one aspect, the baseband processor module processes a first baseband signal having a first data rate in response to accepting the first clock frequency. Alternately, a second baseband signal is processed having a second data rate greater than the first data rate, in response to accepting the second clock frequency.

Although separate receiver and transmitting system have been described above, it should be understood that many communication devices include both receiving and transmission circuitry. It should also be understood that a device may share a baseband processor between both the receiving and transmission sections. Although shown as distinct components, in some aspects of the above-described systems the baseband processor, and frequency conversion and amplification sections of the RF module may be packaged as a single device, such as a system-on-chip (SOC).

Functional Description

Advantageously, the invention described above would enable a communications device to generate UWB waveforms using 802.11n baseband and MAC circuitry being operated at a faster clock rate. Conventionally, 802.11g and 802.11a systems are clocked at 20 MHz to produce a waveform that occupies 16.56 MHz of frequency band. 802.11n, in one mode, is also clocked at 20 MHz to produce a waveform that occupies 17.5 MHz. Both client and access points (AP) designs incorporate an RF transceiver and a baseband/MAC that operate with a common reference clock input.

The baseband/MAC uses the reference clock to control access to the wireless network by regulating timing, encryption, encoding and decoding, and the movement of data between the modem and the host device (e.g., a laptop or phone). The RF transceiver uses the reference clock to generate a high frequency reference that stabilizes the radio's voltage oscillator (VO) at 2.4 or 5 GHz, which is either embedded on the IC or specified as an external component.

TABLE 1

802.11g/a System

| | | Data Rates Mbps | | | | | | | |
|---|---|---|---|---|---|---|---|---|---|
| | | 6 | 9 | 12 | 18 | 24 | 36 | 48 | 54 |
| Modulation/Constellation | | 1 (BPSK) | 1 (BPSK) | 2 (OFDM/QPSK) | 2 (OFDM/QPSK) | 4 (16 QAM) | 4 (16 QAM) | 6 (64 QAM) | 6 (64 QAM) |
| FFT Size | | 64 | 64 | 64 | 64 | 64 | 64 | 64 | 64 |
| Coding Rate (K = 7) | | ½ | ¾ | ½ | ¾ | ½ | ¾ | ⅔ | ¾ |
| Spreading Rate | | 1 | 1 | 1 | 1 | 1 | 1 | 1 | 1 |
| Information Tones | | 48 | 48 | 48 | 48 | 48 | 48 | 48 | 48 |
| Pilot tones | | 4 | 4 | 4 | 4 | 4 | 4 | 4 | 4 |
| Null Tones | | 1 | 1 | 1 | 1 | 1 | 1 | 1 | 1 |
| Data Tones | | 48 | 48 | 48 | 48 | 48 | 48 | 48 | 48 |
| Info. Length (FFT Integration Time) | μs | 3.20 | 3.20 | 3.20 | 3.20 | 3.20 | 3.20 | 3.20 | 3.20 |
| Cyclic Prefix | μs | 0.80 | 0.80 | 0.80 | 0.80 | 0.80 | 0.80 | 0.80 | 0.80 |
| Guard Interval | μs | 0 | 0 | 0 | 0 | 0 | 0 | 0 | 0 |
| Symbol Length | μs | 4.00 | 4.00 | 4.00 | 4.00 | 4.00 | 4.00 | 4.00 | 4.00 |
| Channel Bit Rate | Mbps | 12.00 | 12.00 | 24.00 | 24.00 | 48.00 | 48.00 | 72.00 | 72.00 |
| Tolerable RMS delay spread | μs | 0.2 | 0.2 | 0.2 | 0.2 | 0.2 | 0.2 | 0.2 | 0.2 |
| Subcarrier spacing | MHz | 0.3125 | 0.3125 | 0.3125 | 0.3125 | 0.3125 | 0.3125 | 0.3125 | 0.3125 |
| Occupied bandwidth | MHz | 16.5625 | 16.5625 | 16.5625 | 16.5625 | 16.5625 | 16.5625 | 16.5625 | 16.5625 |
| No. of samples per symbol | | 80 | 80 | 80 | 80 | 80 | 80 | 80 | 80 |
| Sampling rate | MHz | 20 | 20 | 20 | 20 | 20 | 20 | 20 | 20 |

TABLE 2

802.11n System (20 MHz channels)

| | | Data Rates (calculated) | | | | | | | |
|---|---|---|---|---|---|---|---|---|---|
| | | 6.50 | 13.00 | 19.50 | 26.00 | 39.00 | 52.00 | 58.50 | 65.00 |
| Modulation/Constellation | Units | 1 (BPSK) | 2 (QPSK) | 2 (OFDM/QPSK) | 4 (16 QAM) | 4 (16 QAM) | 6 (64 QAM) | 6 (64 QAM) | 6 (64 QAM) |
| FFT Size | | 64 | 64 | 64 | 64 | 64 | 64 | 64 | 64 |
| Coding Rate (K = 7) | | ½ | ½ | ¾ | ½ | ¾ | ⅔ | ¾ | ⅚ |
| Spreading Rate | | 1 | 1 | 1 | 1 | 1 | 1 | 1 | 1 |
| Information Tones | | 52 | 52 | 52 | 52 | 52 | 52 | 52 | 52 |
| Pilot tones | | 4 | 4 | 4 | 4 | 4 | 4 | 4 | 4 |
| Null Tones | | 8 | 8 | 8 | 8 | 8 | 8 | 8 | 8 |
| Data Tones | | 52 | 52 | 52 | 52 | 52 | 52 | 52 | 52 |
| Info. Length (FFT Integration Time) | μs | 3.20 | 3.20 | 3.20 | 3.20 | 3.20 | 3.20 | 3.20 | 3.20 |
| Cyclic Prefix | μs | 0.80 | 0.80 | 0.80 | 0.80 | 0.80 | 0.80 | 0.80 | 0.80 |
| Guard Interval | μs | 0.00 | 0.00 | 0.00 | 0.00 | 0.00 | 0.00 | 0.00 | 0.00 |
| Symbol Length | μs | 4.00 | 4.00 | 4.00 | 4.00 | 4.00 | 4.00 | 4.00 | 4.00 |
| Channel Bit Rate | Mbps | 13.00 | 26.00 | 26.00 | 52.00 | 52.00 | 78.00 | 78.00 | 78.00 |
| Tolerable RMS delay spread | μs | 0.20 | 0.20 | 0.20 | 0.20 | 0.20 | 0.20 | 0.20 | 0.20 |
| Subcarrier spacing | MHz | 0.31 | 0.31 | 0.31 | 0.31 | 0.31 | 0.31 | 0.31 | 0.31 |
| Occupied bandwidth | MHz | 17.50 | 17.50 | 17.50 | 17.50 | 17.50 | 17.50 | 17.50 | 17.50 |
| No. of samples per symbol | | 80 | 80 | 80 | 80 | 80 | 80 | 80 | 80 |
| Sampling rate | MHz | 20 | 20 | 20 | 20 | 20 | 20 | 20 | 20 |

TABLE 3

802.11n System (40 MHz channels)

| | | Data Rates (calculated) | | | | | | | |
|---|---|---|---|---|---|---|---|---|---|
| | | 13.50 | 27.00 | 40.50 | 54.00 | 81.00 | 108.00 | 121.50 | 135.00 |
| Modulation/Constellation | Units | 1 (BPSK) | 2 (QPSK) | 2 (OFDM/QPSK) | 4 (16 QAM) | 4 (16 QAM) | 6 (64 QAM) | 6 (64 QAM) | 6 (64 QAM) |
| FFT Size | | 128 | 128 | 128 | 128 | 128 | 128 | 128 | 128 |
| Coding Rate (K = 7) | | ½ | ½ | ¾ | ½ | ¾ | ⅔ | ¾ | ⅚ |
| Spreading Rate | | 1 | 1 | 1 | 1 | 1 | 1 | 1 | 1 |
| Information Tones | | 108 | 108 | 108 | 108 | 108 | 108 | 108 | 108 |
| Pilot tones | | 6 | 6 | 6 | 6 | 6 | 6 | 6 | 6 |
| Null Tones | | 14 | 14 | 14 | 14 | 14 | 14 | 14 | 14 |
| Data Tones | | 108 | 108 | 108 | 108 | 108 | 108 | 108 | 108 |
| Info. Length (FFT Integration Time) | μs | 3.20 | 3.20 | 3.20 | 3.20 | 3.20 | 3.20 | 3.20 | 3.20 |
| Cyclic Prefix | μs | 0.80 | 0.80 | 0.80 | 0.80 | 0.80 | 0.80 | 0.80 | 0.80 |
| Guard Interval | μs | 0.00 | 0.00 | 0.00 | 0.00 | 0.00 | 0.00 | 0.00 | 0.00 |
| Symbol Length | μs | 4.00 | 4.00 | 4.00 | 4.00 | 4.00 | 4.00 | 4.00 | 4.00 |
| Channel Bit Rate | Mbps | 27.00 | 54.00 | 54.00 | 108.00 | 108.00 | 162.00 | 162.00 | 162.00 |
| Tolerable RMS delay spread | μs | 0.20 | 0.20 | 0.20 | 0.20 | 0.20 | 0.20 | 0.20 | 0.20 |
| Subcarrier spacing | MHz | 0.31 | 0.31 | 0.31 | 0.31 | 0.31 | 0.31 | 0.31 | 0.31 |
| Occupied bandwidth | MHz | 35.63 | 35.63 | 35.63 | 35.63 | 35.63 | 35.63 | 35.63 | 35.63 |
| No. of samples per symbol | | 160 | 160 | 160 | 160 | 160 | 160 | 160 | 160 |
| Sampling rate | MHz | 40 | 40 | 40 | 40 | 40 | 40 | 40 | 40 |

TABLE 4

UWB System

| | Info. Data Rate | | | | | | | |
|---|---|---|---|---|---|---|---|---|
| | 53.3 | 80 | 106.7 | 160 | 200 | 320 | 400 | 480 |
| Modulation/Constellation | 2 (OFDM/QPSK) | 2 (OFDM/QPSK) | 2 (OFDM/QPSK) | 2 (OFDM/QPSK) | 2 (OFDM/QPSK) | 2 (OFDM/DCM) | 2 (OFDM/DCM) | 2 (OFDM/DCM) |
| FFT Size | 128 | 128 | 128 | 128 | 128 | 128 | 128 | 128 |
| Coding Rate (K = 7) | ⅓ | ½ | ⅓ | ½ | ⅝ | ½ | ⅝ | ¾ |
| Spreading Rate | 4 | 4 | 2 | | 2 | 1 | 1 | 1 |
| Information Tones | 25 | 25 | 50 | 50 | 50 | 100 | 100 | 100 |
| Data Tones | 100 | 100 | 100 | 100 | 100 | 100 | 100 | 100 |
| Pilot tones | 12 | 12 | 12 | 12 | 12 | 12 | 12 | 12 |
| Guard tones | 10 | 10 | 10 | 10 | 10 | 10 | 10 | 10 |
| Null tones | 6 | 6 | 6 | 6 | 6 | 6 | 6 | 6 |
| Info. Length (FFT Integration Time) | 242.42 | 242.42 | 242.42 | 242.42 | 242.42 | 242.42 | 242.42 | 242.42 |
| Cyclic Prefix | 60.61 | 60.61 | 60.61 | 60.61 | 60.61 | 60.61 | 60.61 | 60.61 |
| Guard Interval | 9.47 | 9.47 | 9.47 | 9.47 | 9.47 | 9.47 | 9.47 | 9.47 |
| Symbol Length | 312.50 | 312.50 | 312.50 | 312.50 | 312.50 | 312.50 | 312.50 | 312.50 |
| Channel Bit Rate | 640.00 | 640.00 | 640.00 | 640.00 | 640.00 | 640.00 | 640.00 | 640.00 |
| Tolerable RMS delay spread | 15.15 | 15.15 | 15.15 | 15.15 | 15.15 | 15.15 | 15.15 | 15.15 |
| Subcarrier spacing | 4.125 | 4.125 | 4.125 | 4.125 | 4.125 | 4.125 | 4.125 | 4.125 |
| Bandwidth | 503.25 | 503.25 | 503.25 | 503.25 | 503.25 | 503.25 | 503.25 | 503.25 |
| No. of samples per symbol | 165 | 165 | 165 | 165 | 165 | 165 | 165 | 165 |
| Sampling frequency | 528 | 528 | 528 | 528 | 528 | 528 | 528 | 528 |

802.11g/a is an IEEE published standard and 802.11n is in the process of being standardized. UWB, on the other hand, is still in the drafting stage at the time of this writing. As noted above, the invention generates waveforms for an integrated receiver (or transmitter) for both WLAN (802.11n) and WPAN (UWB). Conventionally, receiver architectures are developed and optimized for a specific transmission mode and standard. The present invention however, takes advantage of the fact that both the WLAN and WPAN transmission modes are based on OFDM.

Tables 1 and 2 list the parameters of 802.11g/a and 802.11n WLAN systems, respectively. 802.11g/a is an OFDM system and runs at 20 MHz clock to support data rates between 6 Mbps and 54 Mbps depending on the modulation and coding schemes used. Single-input single-output (SISO) 802.11n is also an OFDM system that runs at 20 MHz clock to support data rates between 6.5 Mbps and 65 Mbps. Table 3 lists the parameters when clocking the 802.11n system at 600 MHz to support data rates between 180 Mbps and 1440 Mbps. Table 4 lists the parameters of a UWB system.

Figure 7:
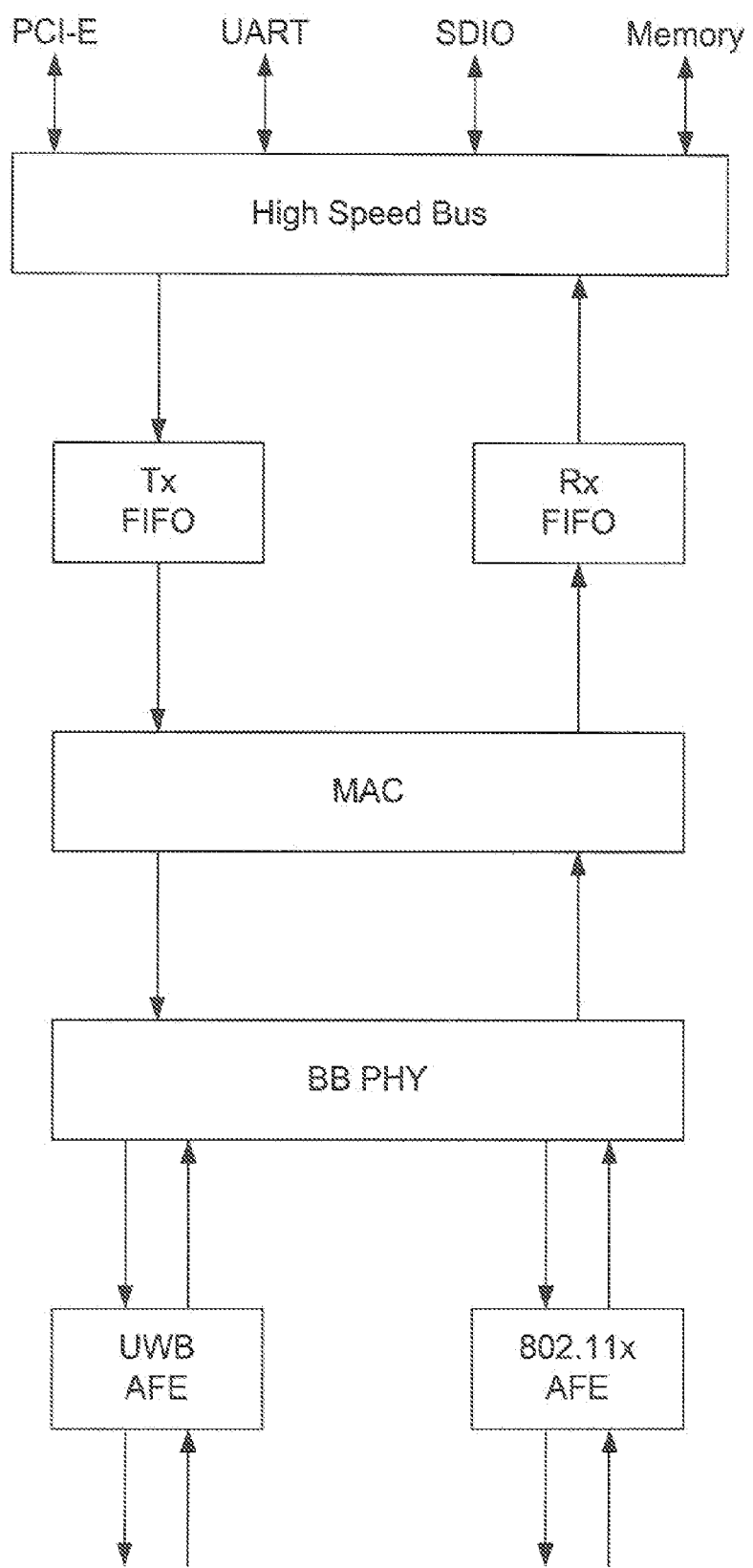
FIG. 7 is a drawing depicting the integration of WLAN and WPAN layers at a high level of abstraction.

FIG. 7 is a drawing depicting the integration of WLAN and WPAN layers at a high level of abstraction. Despite some differences, it can be seen that it is possible to share the PHY and MAC circuitry.

Figure 8:
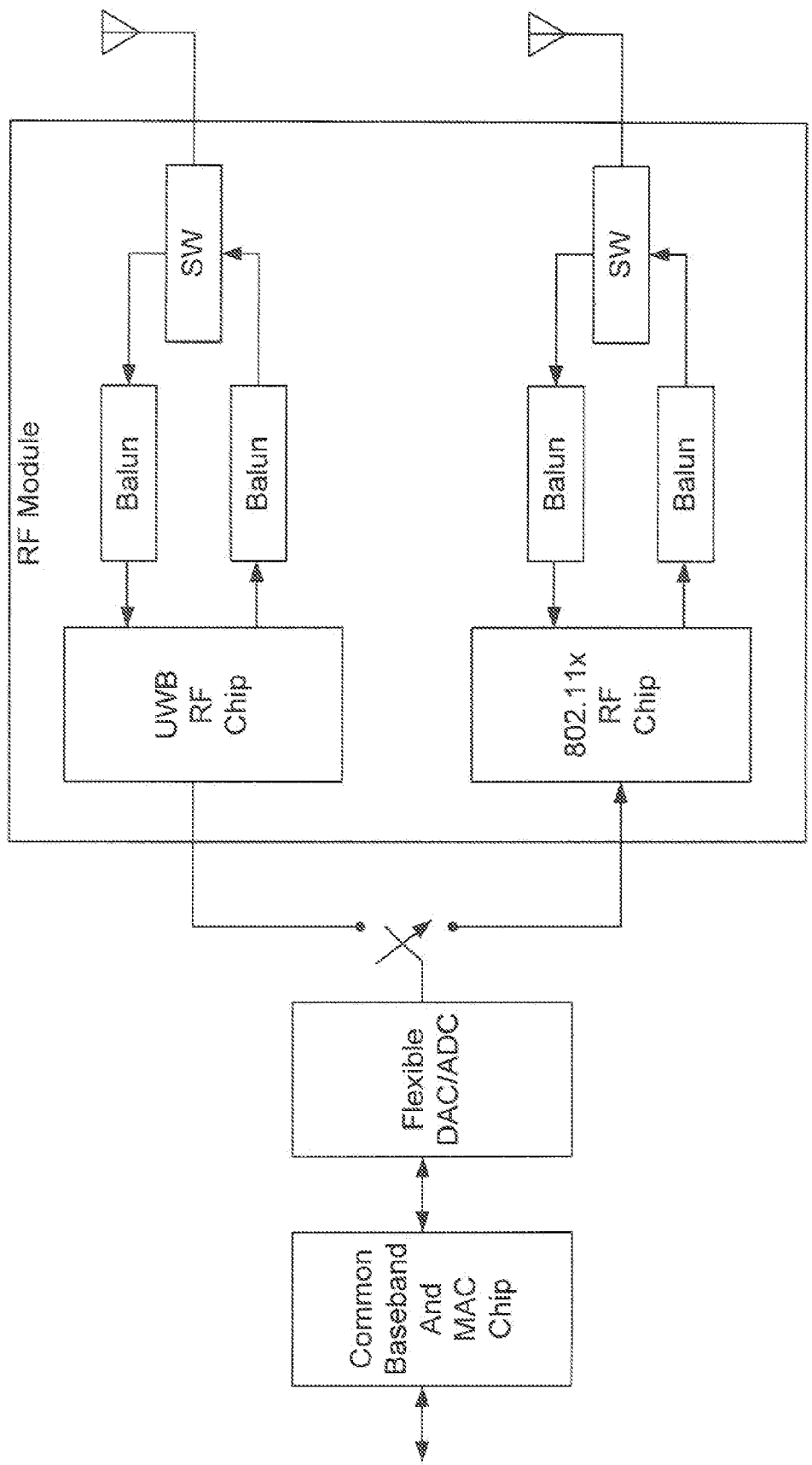
FIG. 8 is a block diagram depicting a WLAN and WPAN transceiver.

FIG. 8 is a block diagram depicting a WLAN and WPAN transceiver. A digital-to-analog (DAC)/analog-to-digital (ADC) converter in the RF module acts to covert the baseband signals. A switch (SW) permits the transmit and receive sections of an RF device to share an antenna. The device is able to use shared PHY and MAC circuitry for both the receive and transmit modes, for both 802.11 and UWB communications.

Figure 9:
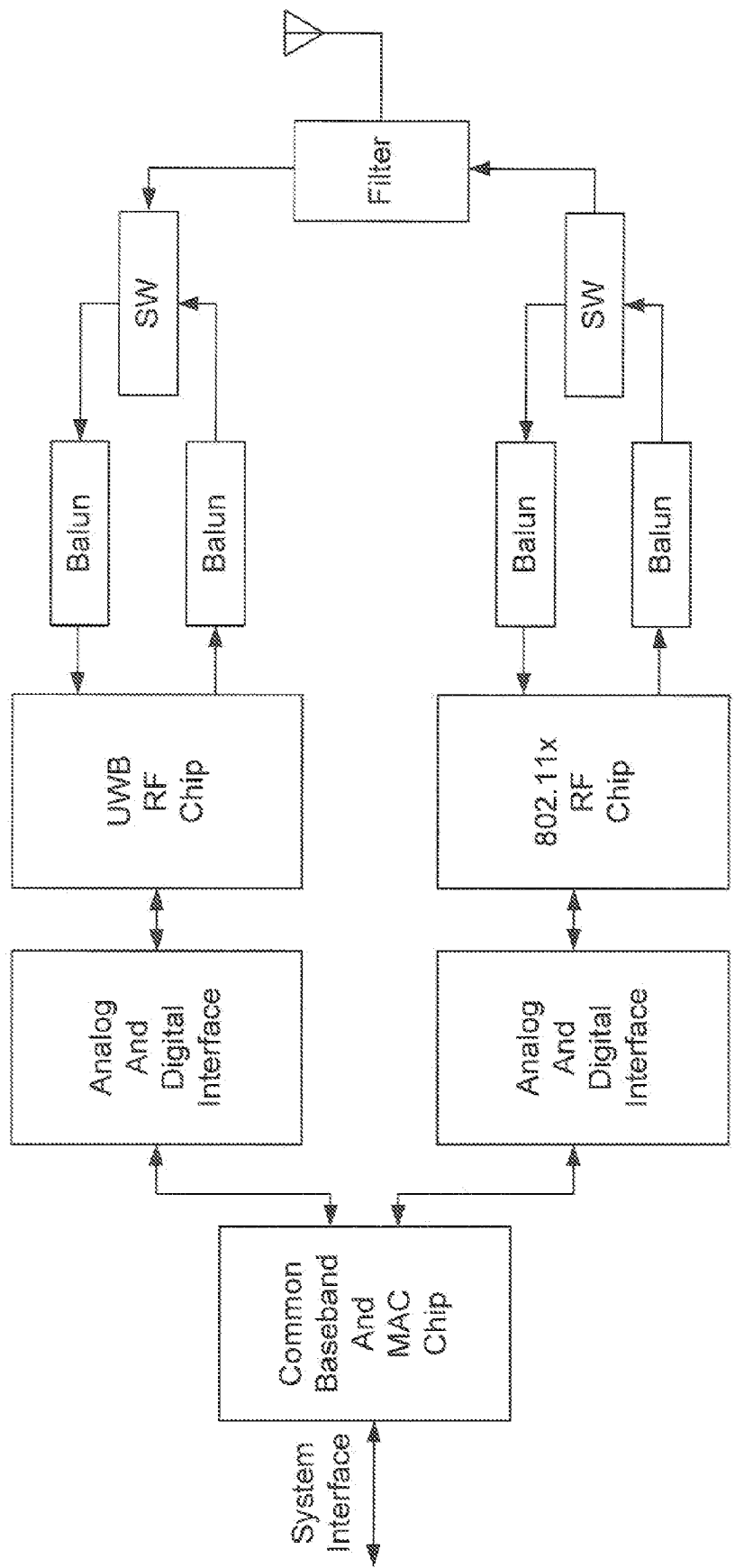
FIG. 9 is a block diagram depicting an alternative aspect of the system of FIG. 8, implemented using a single antenna.

FIG. 9 is a block diagram depicting an alternative aspect of the system of FIG. 8, implemented using a single antenna.

The antenna has a very wideband frequency response and the filter isolates 802.11 communications from UWB communications.

Figure 10:
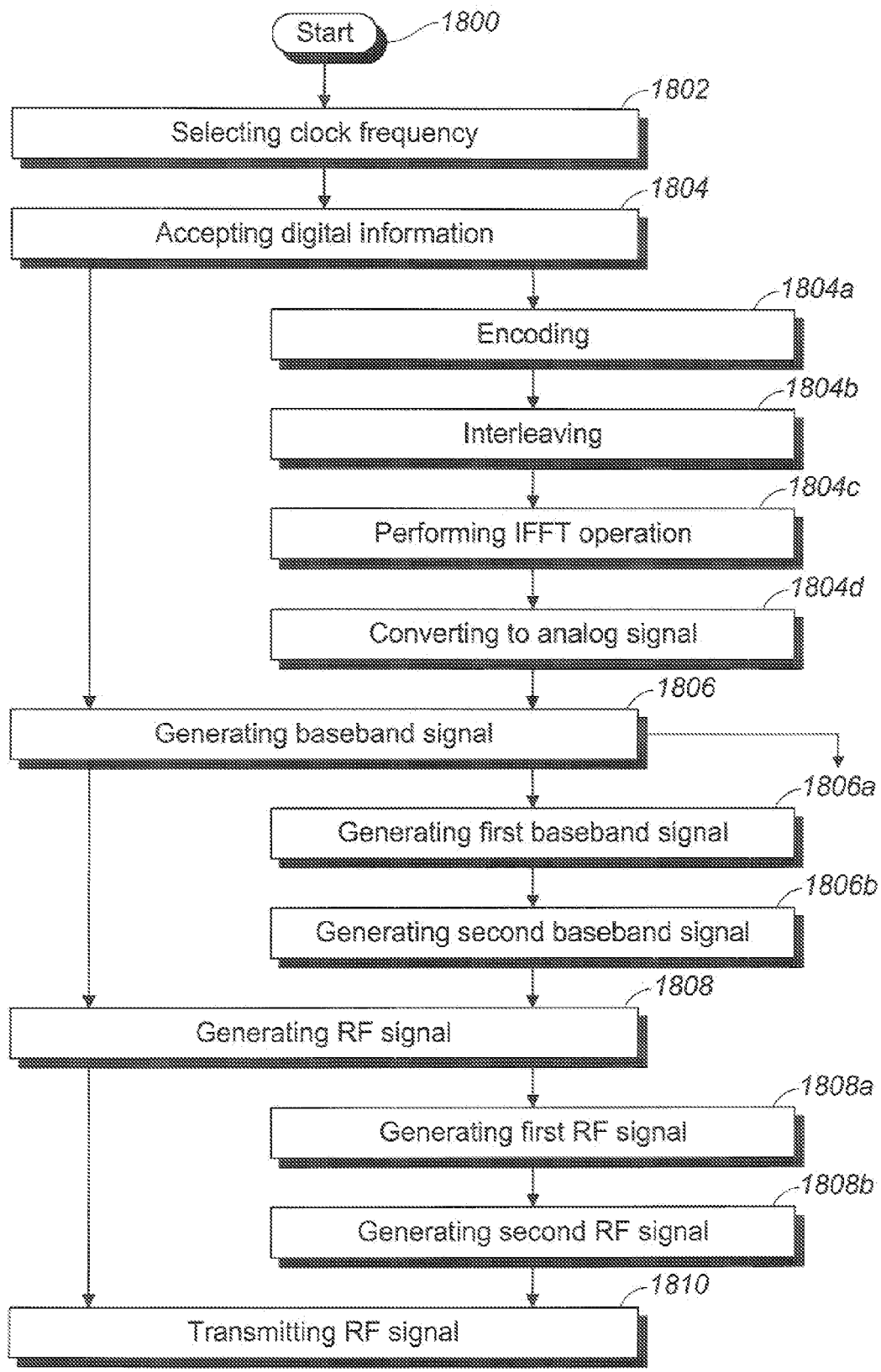
FIG. 10 is a flowchart illustrating a method for transmitting information via alternate bandwidths using a shared baseband processor.

FIG. 10 is a flowchart illustrating a method for transmitting information via alternate bandwidths using a shared baseband processor. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 1800.

Step 1802 selects a clock sampling frequency, which includes a first clock frequency (1×F1) and a second clock frequency (k×F1), where k>1. In one variation, selecting the clock frequency in Step 1802 includes selecting a first clock frequency of l×F1, where l is value equal to either 1 or 2, and F1 is either about 20 MHz or 40 MHz. The second clock frequency is equal to k times the first clock sampling frequency. Step 1804 accepts digital information. Step 1806 generates a baseband signal. Step 1808 converts the baseband signal into an RF signal having a data rate responsive to a selected clock frequency. In some aspects, Step 1810 transmits the RF signal.

In one aspect, generating the baseband signal in Step 1806 includes substeps. Step 1806a generates a first baseband signal having a first data rate in response to selecting the first clock frequency. Step 1806b generates a second baseband signal having a second data rate, greater than the first data rate, in response to selecting the second clock frequency. In a variation, Step 1806a generates a first baseband signal having a plurality of subcarrier frequencies in response to selecting the first clock frequency. Step 1806 generates a second baseband signal having the plurality of subcarrier frequencies (the same number of subcarriers as the first baseband signal) in response to the second clock frequency.

In another aspect, converting the baseband signal into an RF signal includes substeps. Step 1808a generates a first RF signal with a data rate in a range of about 13.5 to 135 Mbps or about 6.5 to 65 Mbps, in response to the first baseband signal. Step 1808b generates a second RF signal with a data rate in a range of about 53.3 to 480 Mbps in response to the second baseband signal. Alternately considered, Step 1808a generates a first RF signal with a bandwidth of either about 20 or 40 MHz. Step 1808b generates a second RF signal a bandwidth which is greater than the lesser of about 500 MHz or about 20% of the bandwidth center frequency. In another variation, Step 1808a generates a first RF signal with subcarrier spacings of about 0.3125 MHz in response to the first baseband signal, and Step 1808b generates a second RF signal with subcarrier spacings of about 0.3125×k/l MHz in response to the second baseband signal.

In one aspect, generating the first baseband signal in Step 1806a includes generating the first baseband signal in response to accepting digital information in Step 1804 that is either in the IBSS (ad-hoc) format or the infrastructure BSS MAC format. Generating the second baseband signal in Step 1806b includes generating the second baseband signal in response to accepting digital information in the IBSS MAC format.

In one aspect, processing the digital information in Step 1804 includes substeps. Step 1804a encodes digital information in response to a selected clock frequency. Step 1804b interleaves the encoded digital information, in response to a selected clock frequency. Step 1804c performs an IFFT operation on the interleaved digital information in response to a selected clock frequency. Step 1804d converts the results of the IFFT operation to an analog baseband signal in response to a selected clock frequency.

In one variation, generating the baseband signal in Step 1806 includes generating n baseband signals at the first clock frequency. Step 1808 converts a multiplexed second baseband signal into a single multiplexed RF signal having a data rate responsive to the second clock frequency, which is n times faster than the first clock frequency. Step 1810 transmits the multiplexed RF signal through a single antenna.

In a second variation, Step 1806 generates n baseband signals at the first clock frequency. Step 1808 converts the n baseband signals (the first baseband signal) into n RF signals, where each RF signal has a data rate responsive to the first clock frequency. Then, Step 1810 transmits the n RF signals via n antennas.

In another aspect, the same steps described above and shown in FIG. 10 may also be used to describe a machine-readable medium having stored thereon instructions for transmitting information via alternate bandwidths using a shared baseband processor.

Figure 11:
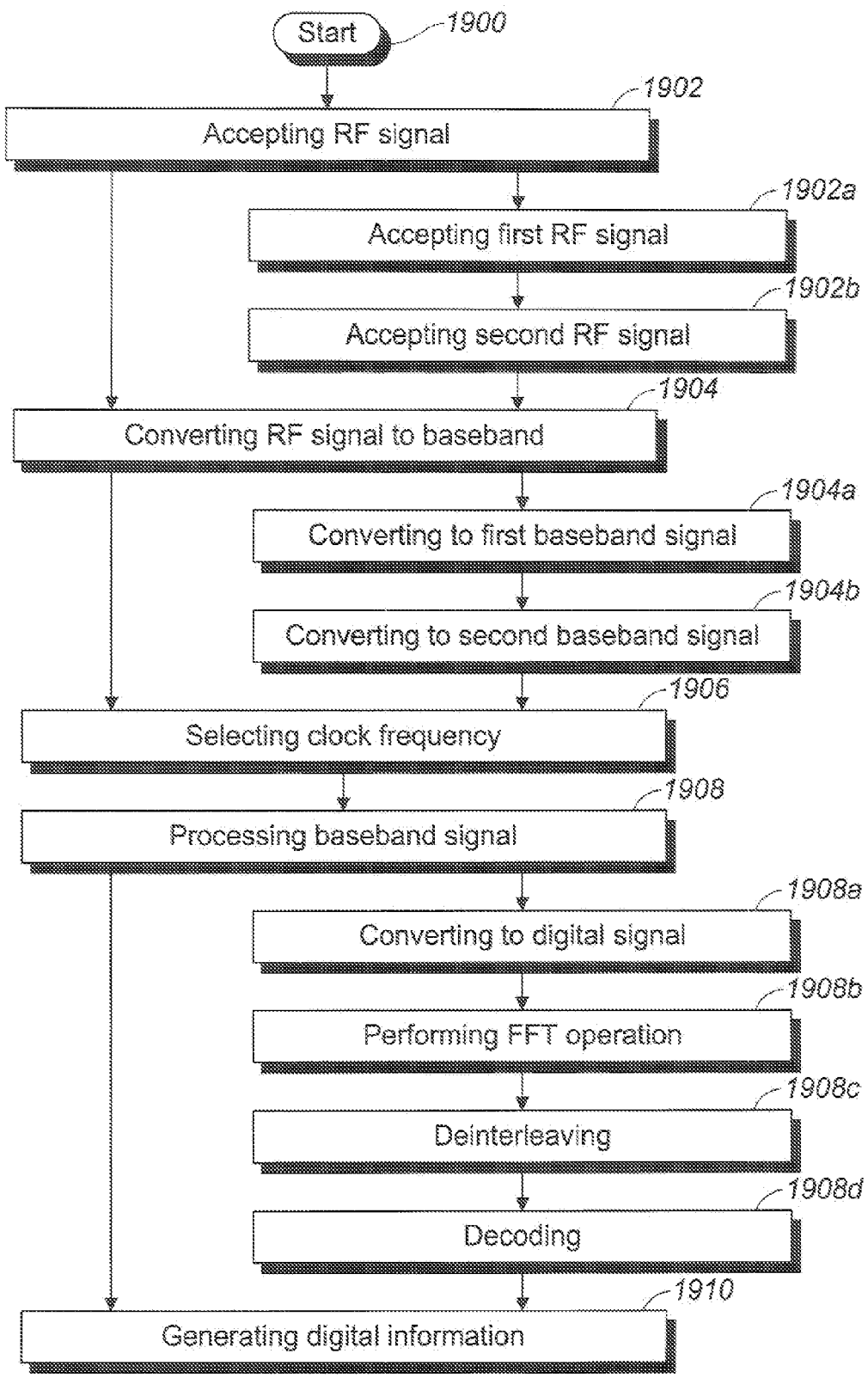
FIG. 11 is a flowchart illustrating a method for receiving information via alternate bandwidths using a shared baseband processor.

FIG. 11 is a flowchart illustrating a method for receiving information via alternate bandwidths using a shared baseband processor. The method starts at Step 1900. Step 1902 accepts an RF signal having a data rate responsive to a selected clock frequency. The RF signal may be received as a radiated signal or via a hard-wired medium. Step 1904 converts the RF signal to a baseband signal. Step 1906 selects a clock sampling frequency, including a first clock frequency (1×F1) and a second clock frequency (k×F1), where k>1. In one aspect, the first clock has a frequency of l×F1, where l is either 1 or 2, and F1 is either about 20 MHz or 40 MHz. That is, the first clock frequency is either 20 or 40 MHz. The second clock has a frequency equal to k times the first clock sampling frequency. Step 1908 processes the baseband signal using a selected clock sampling frequency. Step 1910 generates digital information.

In one aspect, processing the baseband signal in Step 1908 includes substeps. Step 1908a processes a first baseband signal having a first data rate in response to selecting the first clock frequency. Step 1908b processes a second baseband signal having a second data rate, greater than the first data rate, in response to selecting the second clock frequency. In a variation, Step 1908a processes a first baseband signal having a plurality of subcarrier frequencies in response to selecting the first clock frequency, and Step 1908b processes a second baseband signal having the plurality of subcarrier frequencies in response to selecting the second clock frequency. That is, the first and second baseband signals employ the same number of subcarrier frequencies.

In one aspect, accepting the RF signal in Step 1902 includes substeps. Step 1902a accepts a first RF signal with a data rate in a range of about 13.5 to 135 Mbps, or in a range of about 6.5 to 65 Mbps. Step 1902b accepts a second RF signal with a data rate in a range of about 53.3 to 480 Mbps. Then, converting the RF signal to the baseband signal in Step 1904 includes substeps. Step 1904a converts the first RF signal to the first baseband signal, and Step 1904b converts the second RF signal to the second baseband signal.

In a variation, Step 1902a accepts a first RF signal with a bandwidth of either about 20 or 40 MHz, and Step 1902b accepts a second RF signal with a bandwidth which is greater than the lesser of about 500 MHz or about 20% of the bandwidth center frequency. Then, Step 1904a converts the first RF signal to the first baseband signal, and Step 1904b converts the second RF signal to the second baseband signal.

In another variation, Step 1902a accepts a first RF signal with subcarrier spacings of about 0.3125 MHz, and Step 1092b accepts a second RF signal with subcarrier spacings of about 0.3125×k/l MHz. Then, Step 1904a converts the first RF signal to the first baseband signal, and Step 1904b converts the second RF signal to the second baseband signal.

In one aspect, generating digital information in Step 1910 includes generating digital information in an IBSS (ad-hoc) MAC format, regardless of whether a first or second baseband signal is processed. Alternately, Step 1910 generates digital information in an infrastructure BSS MAC format in response to processing the first baseband signal, or Step 1910 generates digital information in an IBSS format in response to processing the second baseband signal.

In another aspect, generating the digital information in Step 1910 includes substeps. Step 1910a converts an analog baseband signal into a digital signal in response to a selected clock frequency. Step 1910b performs an FFT operation on the digital signal in response to a selected clock frequency. Subsequent to performing the FFT, Step 1910c deinterleaves digital information in response to a selected clock frequency, and Step 1910d decodes the digital information in response to a selected clock frequency.

In one variation, Step 1902 accepts a single multiplexed RF signal having a data rate responsive to the second clock frequency, which is n times faster than the first clock frequency. Step 1904 converts the multiplexed RF signal into a multiplexed second baseband signal. Processing the baseband signal in Step 1908 includes: generating n baseband signals from the multiplexed second baseband signal; and, processing each of the n baseband signals at the first clock frequency.

In a second variation, Step 1902 accepts n RF signals, each having a data rate responsive to the first clock frequency. Step 1904 converts the n RF signals into n baseband signals. Then, processing a first baseband signal in Step 1908 includes processing each of the n baseband signals at the first clock frequency.

In another aspect, the same steps described above and shown in FIG. 11 may also be used to describe a machine-readable medium having stored thereon instructions for receiving information via alternate bandwidths using a shared baseband processor.

Various system and method have been presented to describe the transceiving of communications via different RF bandwidths using a shared baseband processor. Details of particular protocols, circuit details, and methodologies have been given as examples to illustrate the invention. However, the invention is not limited to just these examples. Other variations and embodiments of the invention will occur to those skilled in the art.

What is claimed is:

1. A method for transmitting information via alternate bandwidths using a shared baseband processor, the method comprising:
   selecting a clock sampling frequency from a group comprising a first clock frequency (l×F1) and a second clock frequency (k×F1), where k>l;
   generating a baseband signal according to the selected clock frequency; and,
   converting the baseband signal into a radio frequency (RF) signal having a bandwidth and data rate responsive to the selected clock frequency.

2. The method of claim 1 wherein generating the baseband signal includes:
   generating a first baseband signal having a first data rate in response to selecting the first clock frequency; and,
   generating a second baseband signal having a second data rate, greater than the first data rate, in response to selecting the second clock frequency.

3. The method of claim 2 wherein converting the baseband signal into an RF signal includes:
   generating a first RF signal with a data rate in a range selected from a group consisting of about 13.5 to 135 megabits per second (Mbps) and about 6.5 to 65 Mbps, in response to the first baseband signal; and,
   generating a second RF signal with a data rate in a range of about 53.3 to 480 Mbps in response to the second baseband signal.

4. The method of claim 2 wherein converting the baseband signal into an RF signal includes:
   generating a first RF signal with a bandwidth selected from a group consisting of about 20 megahertz (MHz) and about 40 MHz; and,
   generating a second RF signal with a bandwidth which is greater than the lesser of about 500 MHz or about 20% of the bandwidth center frequency.

5. The method of claim 2 wherein converting the baseband signal into an RF signal includes:
   in response to the first baseband signal, generating a first RF signal with subcarrier spacings of about 0.3125 megahertz (MHz); and,
   in response to the second baseband signal, generating a second RF signal with subcarrier spacings of about 0.3125×k/l MHz.

6. The method of claim 2 wherein generating the first baseband signal includes generating the first baseband signal in response to accepting digital information in a media access control (MAC) format selected from a group consisting of Independent Basic Service Set (IBSS) and infrastructure BSS formats; and,
   wherein generating the second baseband signal includes generating the second baseband signal in response to accepting digital information in the IBSS format.

7. The method of claim 1 wherein generating the baseband signal includes:
   accepting digital information;
   encoding the digital information at a selected clock frequency;
   interleaving the encoded digital information at a selected clock frequency;
   performing an inverse fast Fourier transform (IFFT) operating on the interleaved digital information at a selected clock frequency; and,
   converting the results of the IFFT operation to an analog baseband signal at a selected clock frequency.

8. The method of claim 1 wherein l is selected from a group consisting of 1 and 2, and F1 is selected from a group consisting of about 20 MHz and about 40 MHz.

9. The method of claim 1 wherein generating the baseband signal includes generating a first baseband signal as n baseband signals at the first clock frequency; and,
   wherein converting the baseband signal into the RF signal includes converting the n baseband signals into n RF signals radiated through n antennas, each RF signal having a data rate responsive to the first clock frequency;
   wherein generating the baseband signal includes generating a second baseband signal as n baseband signals at the first clock frequency; and,
   wherein converting the baseband signal into the RF signal includes converting a multiplexed second baseband signal into a single multiplexed RF signal radiated through a single antenna at a data rate responsive to the second clock frequency, n times faster than the first clock frequency.

10. The method of claim 1 wherein generating the baseband signal includes:
generating a first baseband signal having a plurality of subcarrier frequencies in response to selecting the first clock frequency; and,
generating a second baseband signal having the plurality of subcarrier frequencies in response to the second clock frequency.

11. A system for transmitting information via alternate bandwidths using a shared baseband processor, the system comprising:
a clock having an input to accept a frequency selection signal and an output to supply a clock sampling frequency selected from a group comprising a first clock frequency (1×F1) and a second clock frequency (k×F1), where k>1;
a baseband processor having an input to accept digital information and an input to accept a selected clock frequency, the baseband processor processing the digital information and supplying a baseband signal according to the selected clock frequency; and,
a radio frequency (RF) module having an input to accept the baseband signal, the RF module supplying an RF signal converted from the baseband signal, having a bandwidth and data rate responsive to a selected clock frequency.

12. The system of claim 11 wherein the baseband processor generates a first baseband signal having a first data rate in response to accepting the first clock frequency, and a second baseband signal having a second data rate, greater than the first data rate, in response to accepting the second clock frequency.

13. The system of claim 12 wherein the RF module includes:
a first RF device for generating a first RF signal with a data rate range selected from a group consisting of about 13.5 to 135 megabits per second (Mbps) and about 6.5 to 65 Mbps, in response to the first baseband signal; and,
a second RF device for generating a second RF signal with a data rate in a range of about 53.3 to 480 Mbps in response to the second baseband signal.

14. The system of claim 12 wherein the RF module includes:
a first RF device for generating a first RF signal with a bandwidth selected from a group consisting of about 20 megahertz (MHz) and about 40 MHz; and,
a second RF device for generating a second RF signal a bandwidth which is greater than the lesser of about 500 MHz or about 20% of the bandwidth center frequency.

15. The system of claim 12 wherein the RF module includes:
a first RF device for generating a first RF signal with subcarrier spacings of about 0.3125 MHz in response to the first baseband signal; and,
a second RF device for generating a second RF signal with subcarrier spacings of about 0.3125×k/l MHz in response to the second baseband signal.

16. The system of claim 12 wherein the baseband processor generates the first baseband signal in response to accepting digital information in a media access control (MAC) format selected from a group consisting of an infrastructure Basic Service Set (BSS) MAC format and an Independent BSS (IBSS) network format, and the second baseband signal in response to accepting digital information in the IBSS MAC format.

17. The system of claim 11 wherein the baseband processor includes:
an encoder having an input to accept digital information, an output to supply encoded digital information in the frequency domain, and an input to accept a selected clock frequency;
an interleaver having an input to accept the encoded digital information, an output to supply interleaved information in the frequency domain to the IFFT, and an input to accept a selected clock frequency;
an inverse fast Fourier transform (IFFT) block having an input to accept information in the frequency domain and an input to accept a selected clock frequency, the IFFT block performing an IFFT operation on the input information and supplying a time domain signal at an output; and,
the system further comprising:
a digital-to-analog converter (DAC) having an input to accept the signal from the IFFT block, an output to supply an analog baseband signal, and an input to accept a selected clock frequency.

18. The system of claim 11 wherein the clock selectively supplies a first clock frequency of l×F1, where l is selected from a group consisting of 1 and 2, and F1 is selected from a group consisting of about 20 MHz and about 40 MHz, and a second clock frequency equal to k times the first clock frequency.

19. The system of claim 11 wherein the baseband processor generates a first baseband signal as n baseband signals at the first clock frequency;
wherein the RF module includes n RF devices to convert the n baseband signals into n RF signals, each RF signal having a data rate responsive to the first clock frequency; and
the system further comprising:
n antennas connected to the n RF device outputs to radiate the n RF signals.

20. The system of claim 19 wherein the baseband processor supplies a second baseband signal as n baseband signals generated at the first clock frequency;
wherein the RF module converts a multiplexed second baseband signal into a single multiplexed RF signal having a data rate responsive to the second clock frequency, n times faster than the first clock frequency; and
the system further comprising:
a single antenna connected to the RF module to radiate the single multiplexed RF signal.

21. The system of claim 11 wherein the baseband processor generates a first baseband signal having a plurality of subcarrier frequencies in response to accepting the first clock frequency, and a second baseband signal having the plurality of subcarrier frequencies in response to accepting the second clock frequency.

22. A method for receiving information via alternate bandwidths using a shared baseband processor, the method comprising:
accepting a radio frequency (RF) signal having a data rate and bandwidth responsive to a selected clock frequency;
converting the RF signal to a baseband signal;
selecting a clock sampling frequency from a group comprising a first clock frequency (l×F1) and a second clock frequency (k×F1), where k>1;
processing the baseband signal according to the selected clock signal; and, generating digital information from the processed baseband signal.

23. The method of claim 22 wherein processing the baseband signal includes:
processing a first baseband signal having a first data rate in response to selecting the first clock frequency; and,
processing a second baseband signal having a second data rate, greater than the first data rate, in response to selecting the second clock frequency.

24. The method of claim 23 wherein accepting the RF signal includes:
accepting a first RF signal with a data rate in a range selected from a group consisting of about 13.5 to 135 megabits per second (Mbps) and about 6.5 to 65 Mbps; and,
accepting a second RF signal with a data rate in a range of about 53.3 to 480 Mbps;
wherein converting the RF signal to the baseband signal includes:
converting the first RF signal to the first baseband signal; and
converting the second RF signal to the second baseband signal.

25. The method of claim 23 wherein accepting the RF signal includes:
accepting a first RF signal with a bandwidth selected from a group consisting of about 20 megahertz (MHz) and about 40 MHz; and,
accepting a second RF signal with a bandwidth which is greater than the lesser of about 500 MHz or about 20% of the bandwidth center frequency;
wherein converting the RF signal to the baseband signal includes:
converting the first RF signal to the first baseband signal; and
converting the second RF signal to the second baseband signal.

26. The method of claim 23 wherein accepting the RF signal includes:
accepting a first RF signal with subcarrier spacings of about 0.3125 megahertz (MHz); and,
accepting a second RF signal with subcarrier spacings of about 0.3125×k/l MHz;
wherein converting the RF signal to the baseband signal includes:
converting the first RF signal to the first baseband signal; and
converting the second RF signal to the second baseband signal.

27. The method of claim 23 wherein generating digital information includes:
generating digital information in a media access control (MAC) format selected from a group consisting of an infrastructure Basic Service Set (BSS) format and an Independent BSS (IBSS) format, in response to processing the first baseband signal; and,
generating digital information in an IBSS format in response to processing the second baseband signal.

28. The method of claim 22 wherein processing the baseband signal includes:
converting an analog baseband signal to a digital signal at a selected clock frequency; and,
performing a fast Fourier transform (FFT) on the digital signal at a selected clock frequency;
deinterleaving transformed digital information at a selected clock frequency; and,
decoding the deinterleaved digital information at a selected clock frequency.

29. The method of claim 22 wherein selecting the clock frequency includes the first clock having a frequency of l×F1, where l is selected from a group consisting of 1 and 2, and F1 is selected from a group consisting of about 20 MHz and about 40 MHz, and the second clock having a frequency equal to k times the first clock frequency.

30. The method of claim 22 wherein accepting the RF signal includes accepting a single multiplexed RF signal having a data rate responsive to the second clock frequency, n times faster than the first clock frequency;
wherein converting the RF signal to the baseband signal includes converting the multiplexed RF signal into a multiplexed second baseband signal;
wherein processing the baseband signal includes:
generating n baseband signals from the multiplexed second baseband signal; and,
processing each of the n baseband signals at a first clock frequency.

31. The method of claim 30 wherein accepting the RF signal includes accepting n RF signals, each RF signal having a data rate responsive to the first clock frequency;
wherein converting the RF signal to the baseband signal includes converting the n RF signals into a first baseband signal of n baseband signals;
wherein processing the baseband signal includes processing each of the n baseband signals at the first clock frequency.

32. The method of claim 22 wherein processing the baseband signal includes:
processing a first baseband signal having a plurality of subcarrier frequencies in response to selecting the first clock frequency; and,
processing a second baseband signal having the plurality of subcarrier frequencies in response to selecting the second clock frequency.

33. A system for receiving information via alternate bandwidths using a shared baseband processor, the system comprising:
a radio frequency (RF) module having an input to accept an RF signal having a data rate and bandwidth responsive to a selected clock frequency, and an output to supply a baseband signal, converted from the RF signal;
a clock having an input to accept a frequency selection signal and an output to supply a clock sampling frequency selected from a group comprising a first clock frequency (l×F1) and a second clock frequency (k×F1), where k>l; and,
a baseband processor having an input to accept the baseband signal and an input to accept a selected clock frequency, the baseband processor processing the baseband signal according to the selected clock signal and supplying digital information from the processed baseband signal.

34. The system of claim 33 wherein the baseband processor processes a first baseband signal having a first data rate in response to selecting the first clock frequency, and a second baseband signal having a second data rate, greater than the first data rate, in response to selecting the second clock frequency.

35. The system of claim 34 wherein the RF module includes:
a first RF device for accepting a first RF signal with a data rate range selected from a group consisting of about 13.5 to 135 megabits per second (Mbps) and about 6.5 to 65 Mbps, and supplying the first baseband signal; and, a second RF device for accepting a second RF signal with a data rate in a range of about 53.3 to 480 Mbps, and supplying the second baseband signal.

36. The system of claim 34 wherein the RF module includes:
a first RF device for accepting a first RF signal with a bandwidth selected from a group consisting of about 20 megahertz (MHz) and about 40 MHz, and supplying the first baseband signal; and,
a second RF device for accepting a second RF signal a bandwidth which is greater than the lesser of about 500 MHz or about 20% of the bandwidth center frequency, and supplying the second baseband signal.

37. The system of claim 34 wherein the RF module includes:
a first RF device for accepting a first RF signal with subcarrier spacings of about 0.3125 MHz, and supplying the first baseband signal; and,
a second RF device for accepting a second RF signal with subcarrier spacings of about 0.3125×k/l MHz, and supplying the second baseband signal.

38. The system of claim 34 wherein the baseband processor generates digital information in a media access control (MAC) format selected from a group consisting of an Independent Basic Service Set (IBSS) format and an infrastructure BSS format, in response to processing the first baseband signal, and digital information in an IBSS format in response to processing the second baseband signal.

39. The system of claim 33 the system further comprising:
an analog to digital converter (ADC) having an input to accept an analog baseband signal, an output to supply a digital signal, and an input to accept a selected clock frequency;
wherein the baseband processor includes:
a fast Fourier transform (FFT) block having an input to accept the digital signal, an output to supply interleaved information in the frequency domain, and an input to accept a selected clock frequency;
a deinterleaver having an input to accept the interleaved information from the FFT block, an output to supply encoded digital information, and an input to accept a selected clock frequency; and,
a decoder having an input to accept the encoded digital information, an output to supply decoded digital information, and an input to accept a selected clock frequency.

40. The system of claim 33 wherein the clock selectively supplies a first clock frequency of l×F1, where l is selected from a group consisting of 1 and 2, and F1 is selected from a group consisting of about 20 MHz and about 40 MHz, and a second clock frequency equal to k times the first clock frequency.

41. The system of claim 33 further comprising:
an antenna connected to the RF module input to supply a single multiplexed RF signal having a data rate responsive to the second clock frequency, n times faster than the first clock frequency;
wherein the RF module converts the multiplexed RF signal into a multiplexed second baseband signal; and
wherein the baseband processor accepts the multiplexed second baseband signal, generates n baseband signals, and processes each of n baseband signals at the first clock frequency.

42. The system of claim 41 further comprising:
n antennas, each antenna supplying a received RF signal having a data rate responsive to the first clock frequency;
wherein the RF module includes n RF devices, each RF device having an input connected to a corresponding antenna and an output to supply a baseband signal; and,
wherein the baseband processor accepts a first baseband signal as the n baseband signals, and processes each of the n baseband signals at the first clock frequency.

43. The system of claim 33 wherein the baseband processor processes a first baseband signal having a plurality of subcarrier frequencies in response to selecting the first clock frequency, and a second baseband signal having the plurality of subcarrier frequencies in response to selecting the second clock frequency.

44. A non-transitory machine-readable medium having stored thereon instructions for transmitting information via alternate bandwidths using a shared baseband processor, the instructions comprising:
selecting, using a processor, a clock sampling frequency from a group comprising a first clock frequency (l×F1) and a second clock frequency (k×F1), where k>l;
generating, using the processor, a baseband signal according to the selected clock frequency; and,
converting, using the processor, the baseband signal into a radio frequency (RF) signal having a bandwidth and data rate responsive to a selected clock frequency.

45. The non-transitory machine-readable medium of claim 44 wherein generating the baseband signal includes:
generating, using the processor, a first baseband signal having a first data rate in response to selecting the first clock frequency; and,
generating, using the processor, a second baseband signal having a second data rate, greater than the first data rate, in response to selecting the second clock frequency.

46. A non-transitory machine-readable medium having stored thereon instructions for receiving information via alternate bandwidths using a shared baseband processor, the instructions comprising:
accepting, using a processor, a radio frequency (RF) signal having a data rate and bandwidth responsive to a selected clock frequency;
converting, using the processor, the RF signal to a baseband signal; selecting, using the processor, a clock sampling frequency from a group comprising a first clock frequency (l×F1) and a second clock frequency (k×F1), where k>l;
processing, using the processor, the baseband signal according to the selected clock signal; and,
generating, using the processor, digital information processed baseband signal.

47. The non-transitory machine-readable medium of claim 46 wherein processing the baseband signal includes:
processing, using the processor, a first baseband signal having a first data rate in response to selecting the first clock frequency; and,
processing, using the processor, a second baseband signal having a second data rate, greater than the first data rate, in response to selecting the second clock frequency.

48. A communication device for transmitting information via alternate bandwidths using a shared baseband processor, the device comprising:
a means for clocking having an input to accept a frequency selection signal and an output for supplying a clock sampling frequency selected from a group comprising a first clock frequency (l×F1) and a second clock frequency (k×F1), where k>l;
a means for baseband processing having an input to accept digital information and an input to accept a selected clock frequency, the baseband processing means processing the digital information and supplying a baseband signal according to the selected clock frequency; and,
a means for radio frequency (RF) processing having an input to accept the baseband signal, the RF module supplying an RF signal having a bandwidth and data rate responsive to a selected clock frequency, converted from the baseband signal.

49. The device of claim 48 wherein the baseband processing means generates a first baseband signal having a first data rate in response to accepting the first clock frequency, and a second baseband signal having a second data rate, greater than the first data rate, in response to accepting the second clock frequency.

50. The device of claim 49 wherein the RF means includes:
a means for generating a first RF signal with a data rate range selected from a group consisting of about 13.5 to 135 megabits per second (Mbps) and about 6.5 to 65 Mbps, in response to the first baseband signal; and,
a means for generating a second RF signal with a data rate in a range of about 53.3 to 480 Mbps in response to the second baseband signal.

51. The device of claim 49 wherein the RF means includes:
a means for generating a first RF signal with a bandwidth selected from a group consisting of about 20 megahertz (MHz) and about 40 MHz; and,
a means for generating a second RF signal a bandwidth which is greater than the lesser of about 500 MHz or about 20% of the bandwidth center frequency.

52. The device of claim 49 wherein the RF means includes:
a means for generating a first RF signal with subcarrier spacings of about 0.3125 MHz in response to the first baseband signal; and,
a means for generating a second RF signal with subcarrier spacings of about 0.3125×k/l MHz in response to the second baseband signal.

53. The device of claim 49 wherein the baseband processing means generates the first baseband signal in response to accepting digital information in a media access control (MAC) format selected from a group consisting of an Independent Basic Service Set (IBSS) format and an infrastructure BSS MAC format, and the second baseband signal in response to accepting digital information in the IBSS format.

54. The device of claim 49 wherein the baseband processing means includes:
a means for encoding having an input to accept digital information and an output to supply encoded digital information in the frequency domain at a selected clock frequency;
a means for interleaving having an input to accept the encoded digital information and an output to supply interleaved information in the frequency domain at a selected clock frequency;
a means for inverse fast Fourier transform (IFFT) processing having an input to accept information in the frequency domain, the IFFT means performing an IFFT operation on the input information and supplying a time domain signal at an output at a selected clock frequency; and,
the device further comprising:
a digital-to-analog conversion means for converting the time domain signal into an analog baseband signal at a selected clock frequency.

55. The device of claim 49 wherein the clocking means selectively supplies a first clock frequency of l×F1, where l is selected from a group consisting of 1 and 2, and F1 is selected from a group consisting of about 20 MHz and about 40 MHz, and a second clock frequency equal to k times the first clock frequency.

56. The device of claim 49 wherein the baseband processing means supplies a second baseband signal by generating n baseband signals at the first clock frequency;
wherein the RF means converts a multiplexed second baseband signal into a single multiplexed RF signal having a data rate responsive to the second clock frequency, n times faster than the first clock frequency; and
the device further comprising:
a single radiating means connected to the RF module output to radiate the multiplexed RF signal.

57. The device of claim 56 wherein the baseband processing means supplies a first baseband signal by generating n baseband signals at the first clock frequency;
wherein the RF means includes n RF means, each RF means having an input to accept a corresponding baseband signal and an output to supply an RF signal responsive to the first clock frequency; and
the system further comprising:
n radiating means, each connected to a corresponding the RF means output to radiate n RF signals.

58. The device of claim 49 wherein the baseband processing means generates a first baseband signal having a plurality of subcarrier frequencies in response to accepting the first clock frequency, and a second baseband signal having the plurality of subcarrier frequencies in response to accepting the second clock frequency.

59. A communication device for receiving information via alternate bandwidths using a shared baseband processor, the device comprising:
a means for radio frequency (RF) processing having an input to accept an RF signal having a data rate and bandwidth responsive to a selected clock sampling frequency, and an output to supply a baseband signal converted from the RF signal;
a means for clocking having an input to accept a frequency selection signal and an output to supply a clock sampling frequency selected from a group comprising a first clock frequency (l×F1) and a second clock frequency (k×F1), where k>1; and,
a means for baseband processing having an input to accept the baseband signal and an input to accept a selected clock frequency, the baseband processor means processing the baseband signal according to the selected clock frequency to extract digital information.

60. The device of claim 59 wherein the baseband processor means processes a first baseband signal having a first data rate in response to selecting the first clock frequency, and a second baseband signal having a second data rate, greater than the first data rate, in response to selecting the second clock frequency.

61. The device of claim 60 wherein the RF means includes:
a means for accepting a first RF signal with a data rate range selected from a group consisting of about 13.5 to 135 megabits per second (Mbps) and about 6.5 to 65 Mbps, and supplying the first baseband signal; and,
a means for accepting a second RF signal with a data rate in a range of about 53.3 to 480 Mbps, and supplying the second baseband signal.

62. The device of claim 60 wherein the RF means includes:
a means for accepting a first RF signal with a bandwidth selected from a group consisting of about 20 megahertz (MHz) and about 40 MHz, and supplying the first baseband signal; and, a means for accepting a second RF signal a bandwidth which is greater than the lesser of about 500 MHz or about 20% of the bandwidth center frequency, and supplying the second baseband signal.

63. The device of claim 60 wherein the RF means includes:
a means for accepting a first RF signal with subcarrier spacings of about 0.3125 MHz, and supplying the first baseband signal; and,
a means for accepting a second RF signal with subcarrier spacings of about 0.3125×k/l MHz, and supplying the second baseband signal.

64. The device of claim 59 wherein the baseband processor means generates digital information in a media access control (MAC) format selected from a group consisting of an Independent Basic Service Set (IBSS) and an infrastructure BSS format, in response to processing the first baseband signal, and in an IBSS format in response to processing the second baseband signal.

65. The device of claim 59 further comprising:
an analog-to-digital means for accepting an analog baseband signal and output to supply a digital signal at a selected clock frequency;
wherein the baseband processor means includes:
a means for fast Fourier transform (FFT) processing having an input to accept the digital signal and an output to supply interleaved information in the frequency domain at a selected clock frequency;
a means for deinterleaving having an input to accept the interleaved information from the FFT block and an output to supply encoded digital information at a selected clock frequency; and,
a means for decoding having an input to accept the encoded digital information and an output to supply decoded digital information at a selected clock frequency.

66. The device of claim 59 wherein the clocking means selectively supplies a first clock frequency of l×F1, where l is selected from a group consisting of 1 and 2, and F1 is selected from a group consisting of about 20 MHz and about 40 MHz, and a second clock frequency equal to k times the first clock frequency.

67. The device of claim 59 further comprising:
a radiating means connected to the RF means input to supply a single received multiplexed RF signal having a data rate responsive to the second clock frequency, n times faster than the first clock frequency;
wherein the RF means converts the multiplexed RF signal into a multiplexed second baseband signal; and
wherein the baseband processor means accepts the multiplexed second baseband signal, generates n baseband signals, and processes each of the n baseband signals at the first frequency.

68. The device of claim 67 further comprising:
n radiating means, each supplying a received RF signal having a data rate responsive to the first clock frequency;
wherein the RF means includes n RF means, each RF means having an input connected to a corresponding radiating means and an output to supply a baseband signal;
wherein the baseband processor means accepts a first baseband signal as n baseband signals, and processes each of the n baseband signals at the first clock frequency.

69. The device of claim 59 wherein the baseband processor means processes a first baseband signal having a plurality of subcarrier frequencies in response to selecting the first clock frequency, and a second baseband signal having the plurality of subcarrier frequencies in response to selecting the second clock frequency.

70. A communications processing device for transmitting information via alternate bandwidths using a shared baseband processor module, the processing device comprising:
a clock module having an input to accept a frequency selection signal and an output to supply a clock sampling frequency selected from a group comprising a first clock frequency (l×F1) and a second clock frequency (k×F1), where k>1;
a baseband processor module having an input to accept digital information and an input to accept a selected clock frequency, the baseband processor module processing the digital information and supplying a baseband signal according to the selected clock frequency; and,
a radio frequency (RF) module having an input to accept the baseband signal, the RF module supplying an RF signal having a bandwidth and data rate responsive to a selected clock frequency, converted from the baseband signal.

71. The processing device of claim 70 wherein the baseband processor module generates a first baseband signal having a first data rate in response to accepting the first clock frequency, and a second baseband signal having a second data rate, greater than the first data rate, in response to accepting the second clock frequency.

72. A communications processing device for receiving information via alternate bandwidths using a shared baseband processor module, the processing device comprising:
a radio frequency (RF) module having an input to accept an RF signal having a bandwidth and data rate responsive to a selected clock frequency, and an output to supply a baseband signal converted from the RF signal;
a clock module having an input to accept a frequency selection signal and an output to supply a clock sampling frequency selected from a group comprising a first clock frequency (l×F1) and a second clock frequency (k×F1), where k>1; and,
a baseband processor module having an input to accept the baseband signal and an input to accept a selected clock frequency, the baseband processor module processing the baseband signal according to the selected clock frequency and extracting digital information.

73. The processing device of claim 72 wherein the baseband processor module processes a first baseband signal having a first data rate in response to accepting the first clock frequency, and a second baseband signal having a second data rate, greater than the first data rate, in response to accepting the second clock frequency.

* * * * *